Dec. 19, 1939.　　　　J. F. FERM　　　　2,183,557
APPARATUS FOR MAKING ROLL-FORGED ARTICLES
Original Filed Sept. 22, 1936　　24 Sheets-Sheet 2

INVENTOR.
John F. Ferm
BY
Fay, Oberlin & Fay
ATTORNEYS.

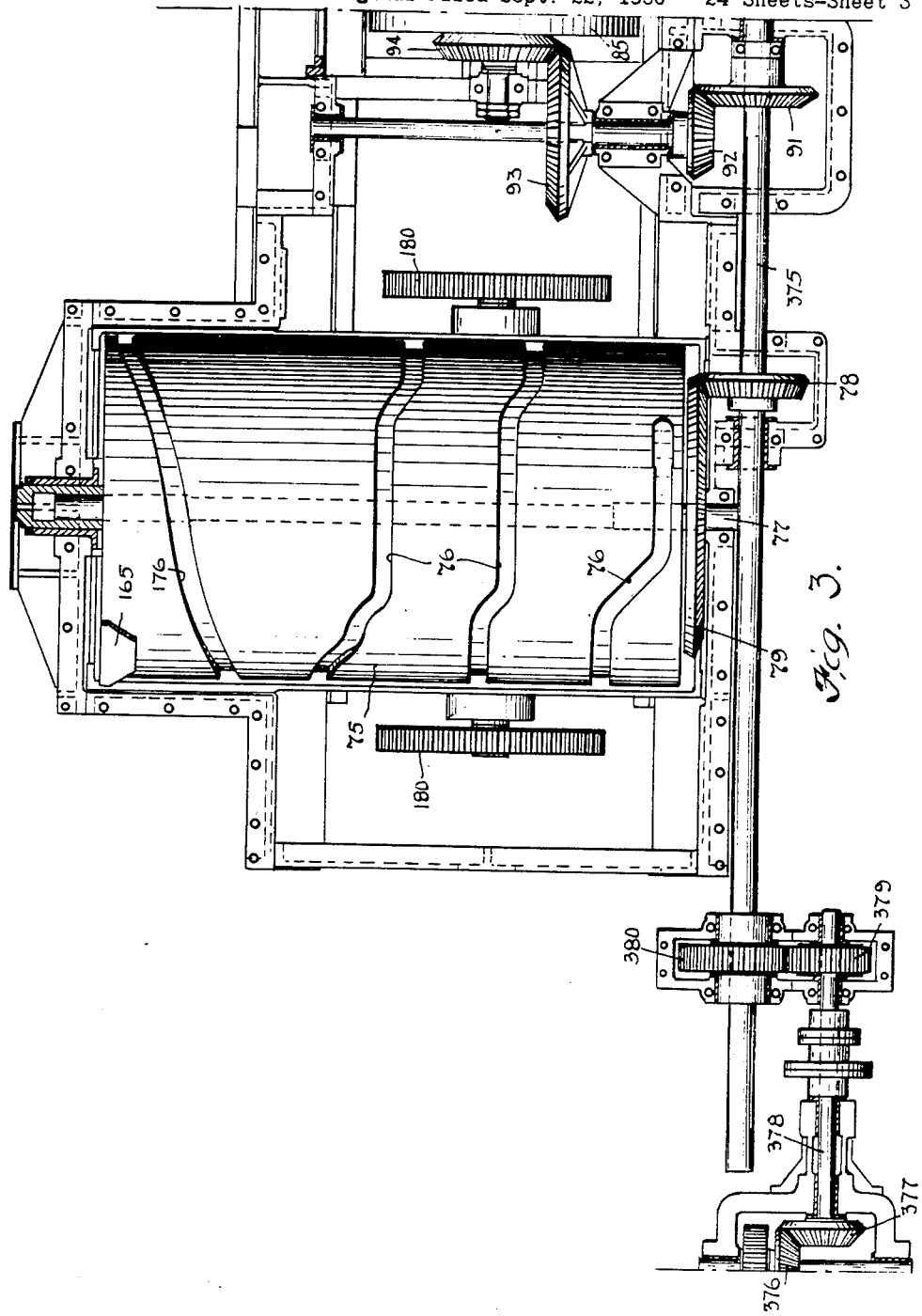

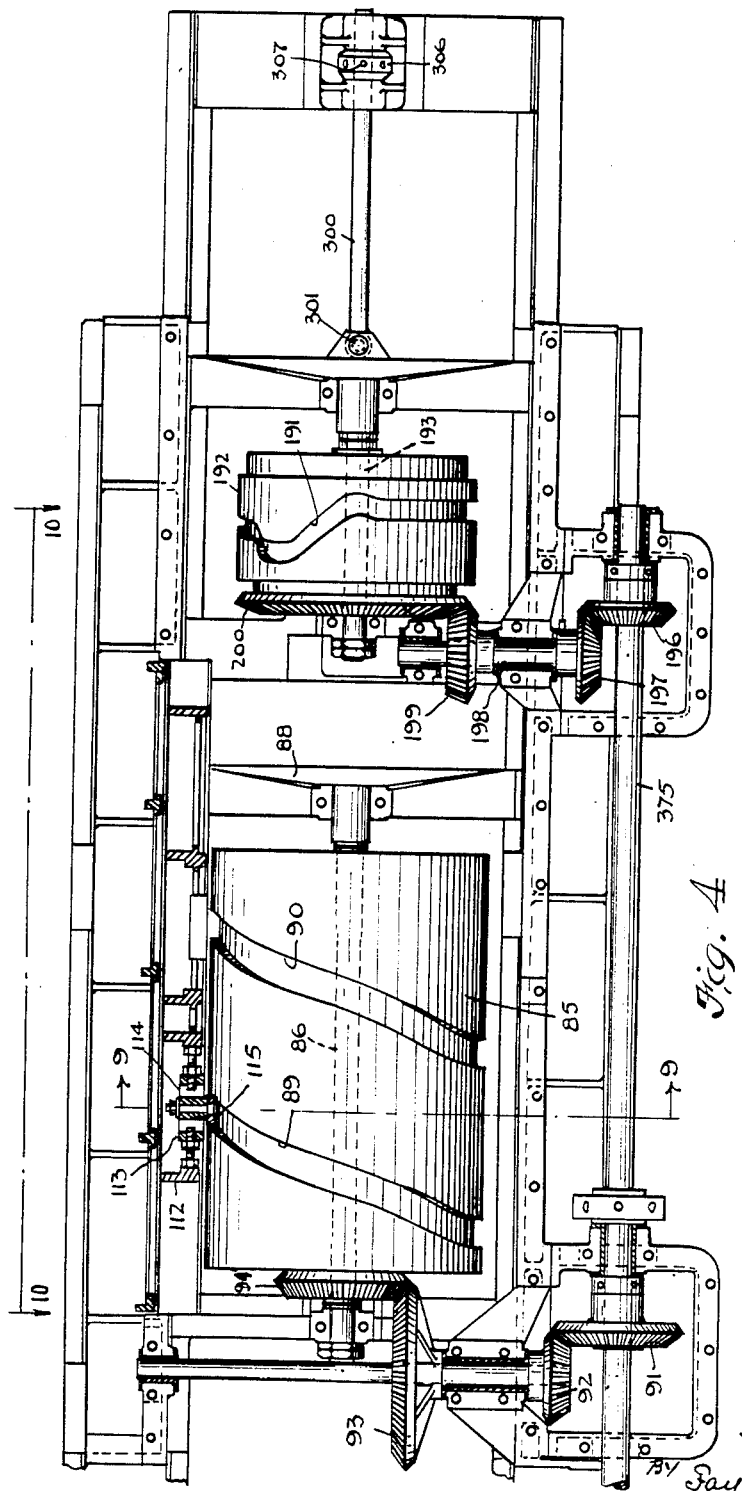

Dec. 19, 1939.   J. F. FERM   2,183,557
APPARATUS FOR MAKING ROLL-FORGED ARTICLES
Original Filed Sept. 22, 1936   24 Sheets-Sheet 5
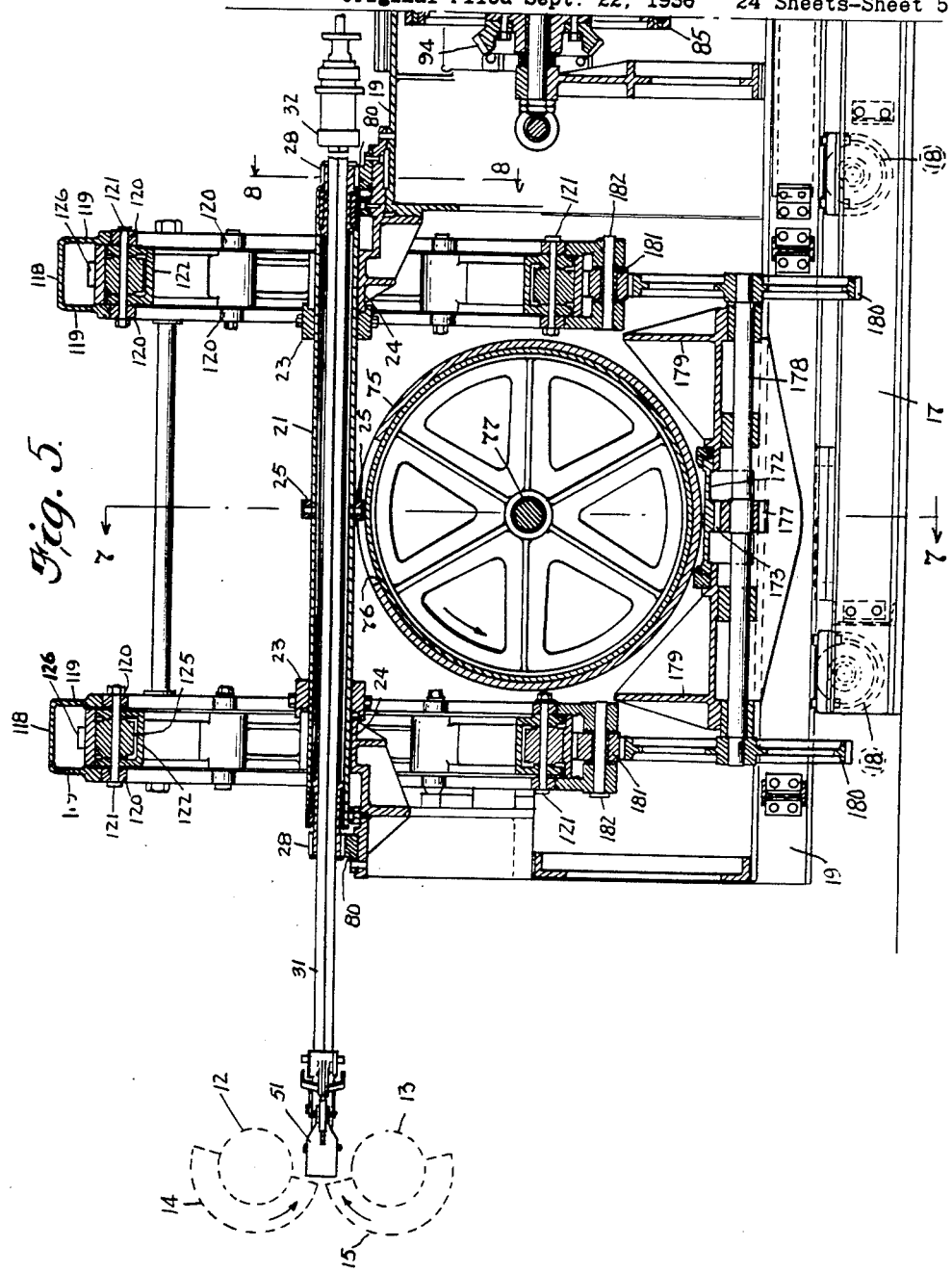
INVENTOR.
John F. Ferm
BY
Fay, Oberlin & Fay
ATTORNEYS.

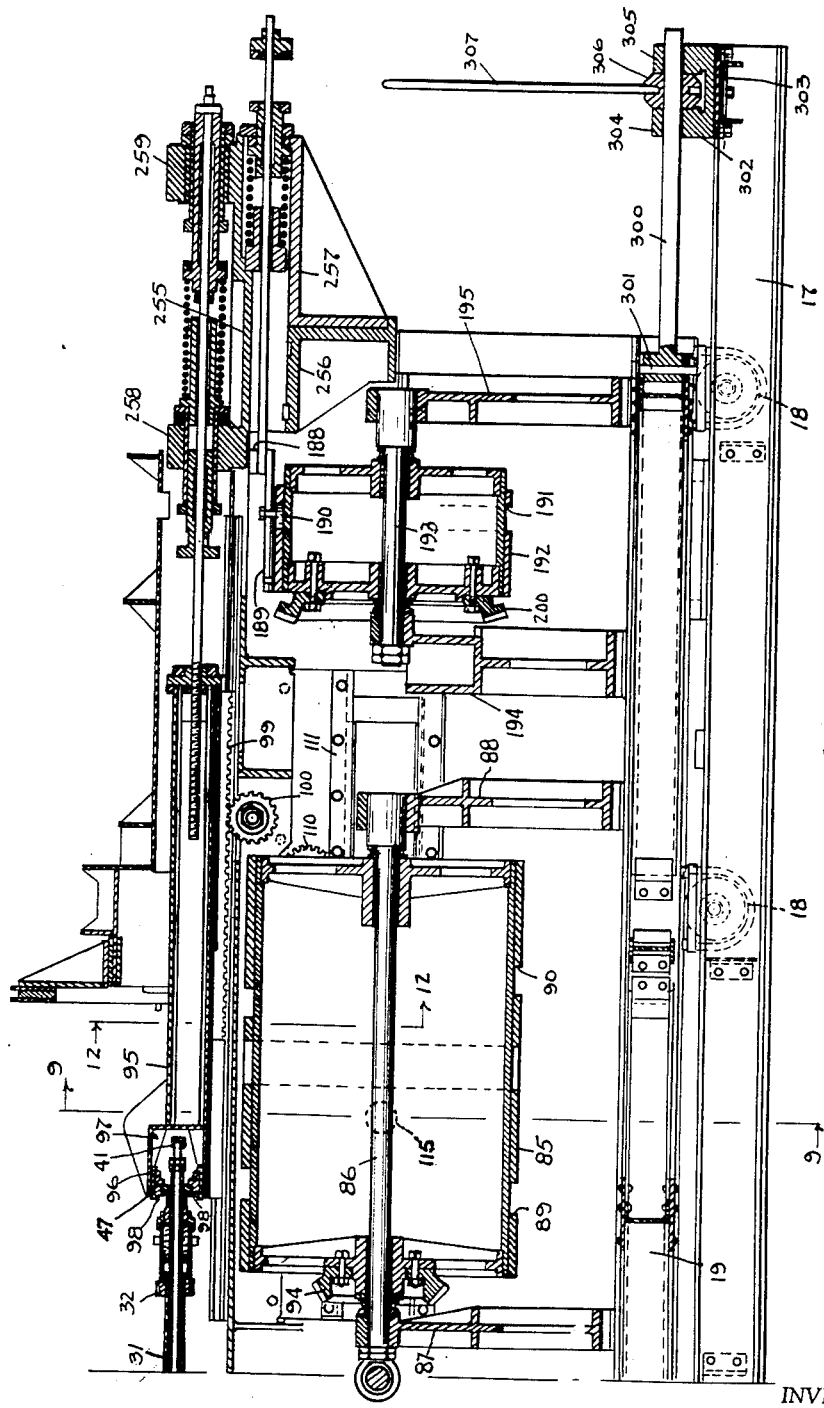

Dec. 19, 1939.　　　　J. F. FERM　　　　2,183,557
APPARATUS FOR MAKING ROLL-FORGED ARTICLES
Original Filed Sept. 22, 1936　　24 Sheets-Sheet 7
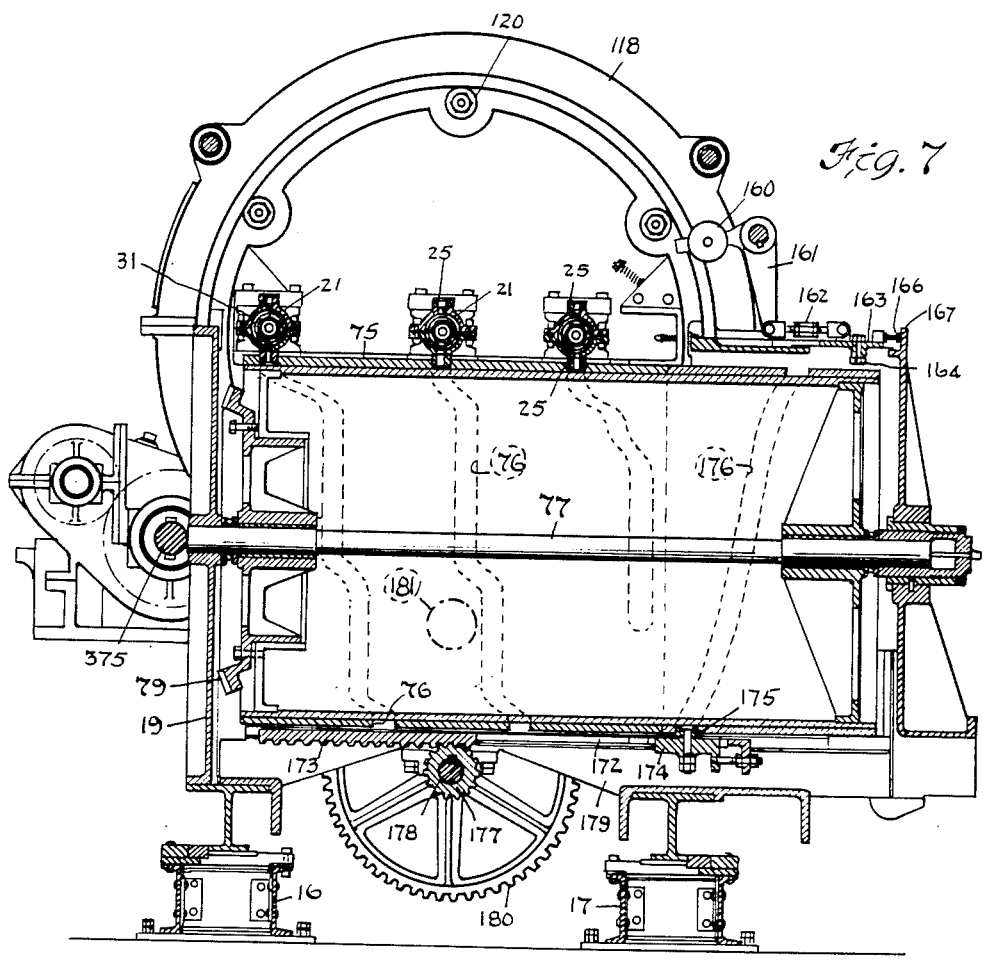
INVENTOR.
John F. Ferm
BY Fay, Oberlin & Fay
ATTORNEYS Dec. 19, 1939.  J. F. FERM  2,183,557
APPARATUS FOR MAKING ROLL-FORGED ARTICLES
Original Filed Sept. 22, 1936  24 Sheets-Sheet 3
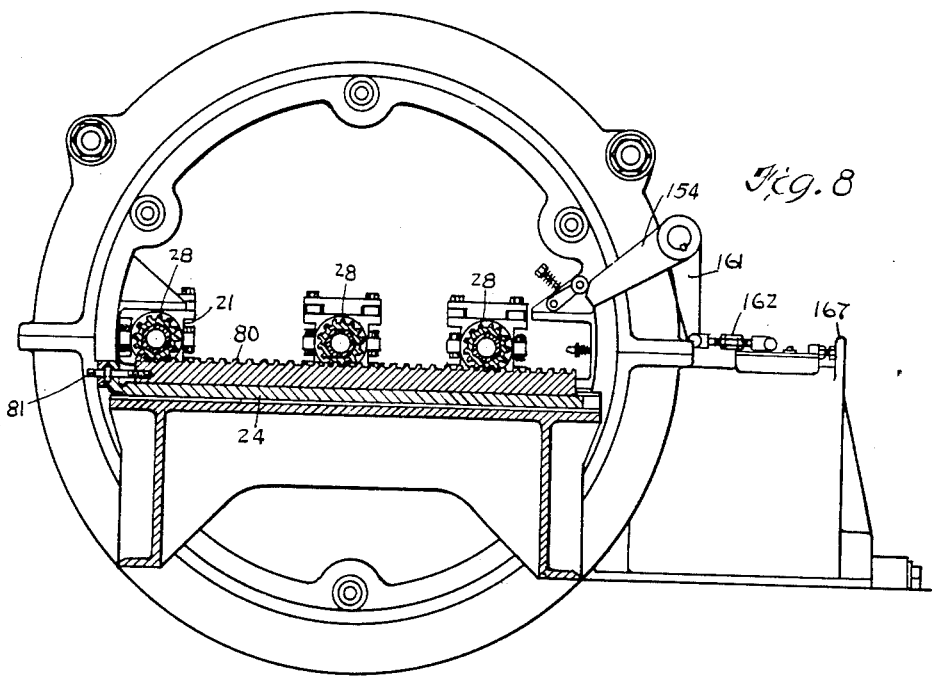
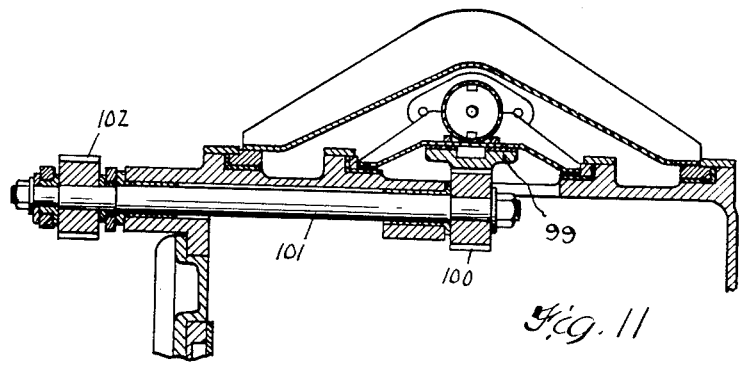
INVENTOR.
John F. Ferm
BY Fay, Oberlin & Fay
ATTORNEYS.

Dec. 19, 1939.  J. F. FERM  2,183,557
APPARATUS FOR MAKING ROLL-FORGED ARTICLES
Original Filed Sept. 22, 1936   24 Sheets-Sheet 9

INVENTOR.
John F. Ferm
BY Fay, Oberlin & Fay
ATTORNEYS

Dec. 19, 1939.                J. F. FERM                2,183,557
              APPARATUS FOR MAKING ROLL-FORGED ARTICLES
               Original Filed Sept. 22, 1936    24 Sheets-Sheet 10
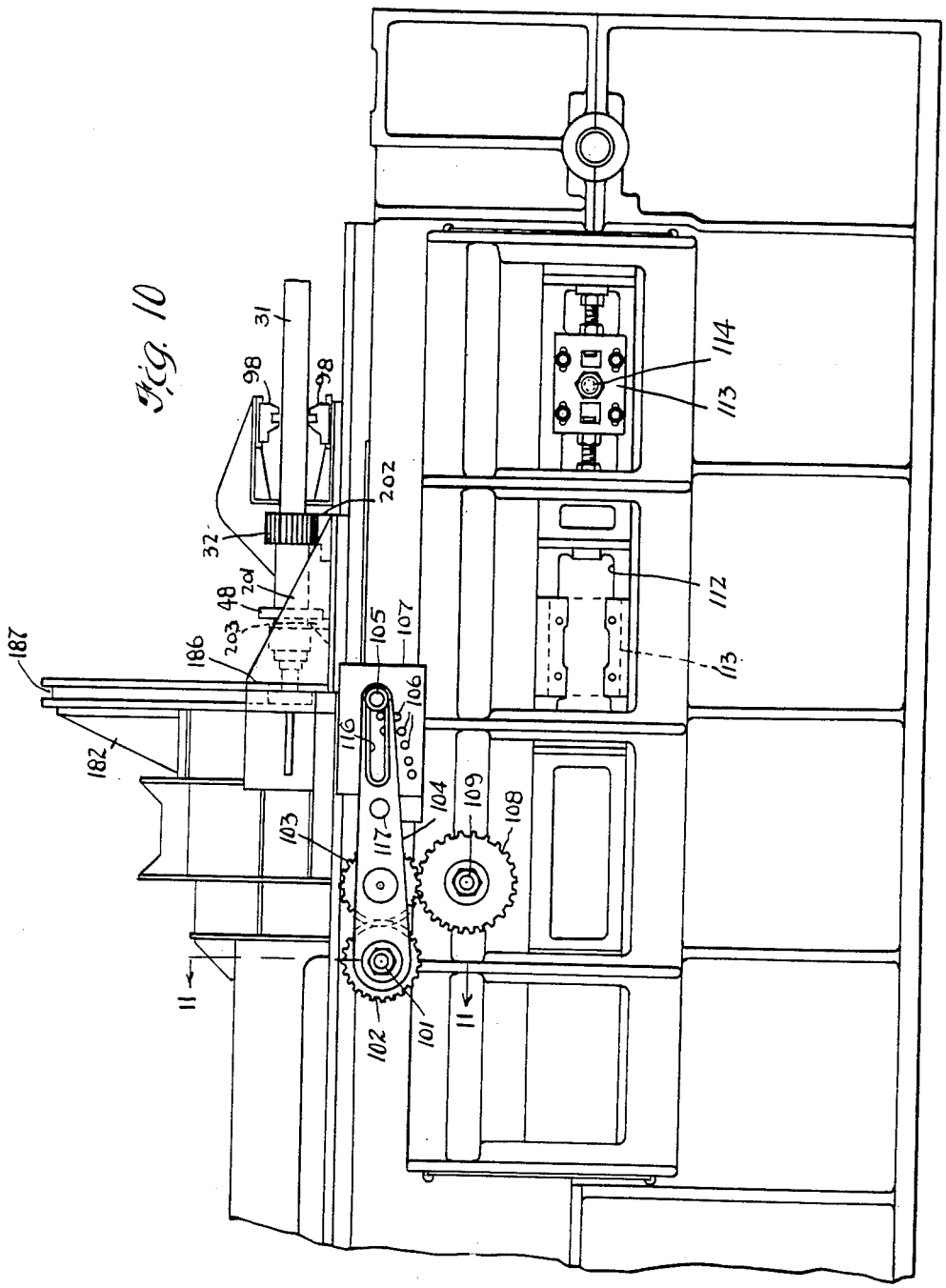
INVENTOR.
John F. Ferm
BY Fay, Oberlin & Fay
ATTORNEYS.

Dec. 19, 1939.　　　　J. F. FERM　　　　2,183,557
APPARATUS FOR MAKING ROLL-FORGED ARTICLES
Original Filed Sept. 22, 1936　　24 Sheets-Sheet 11
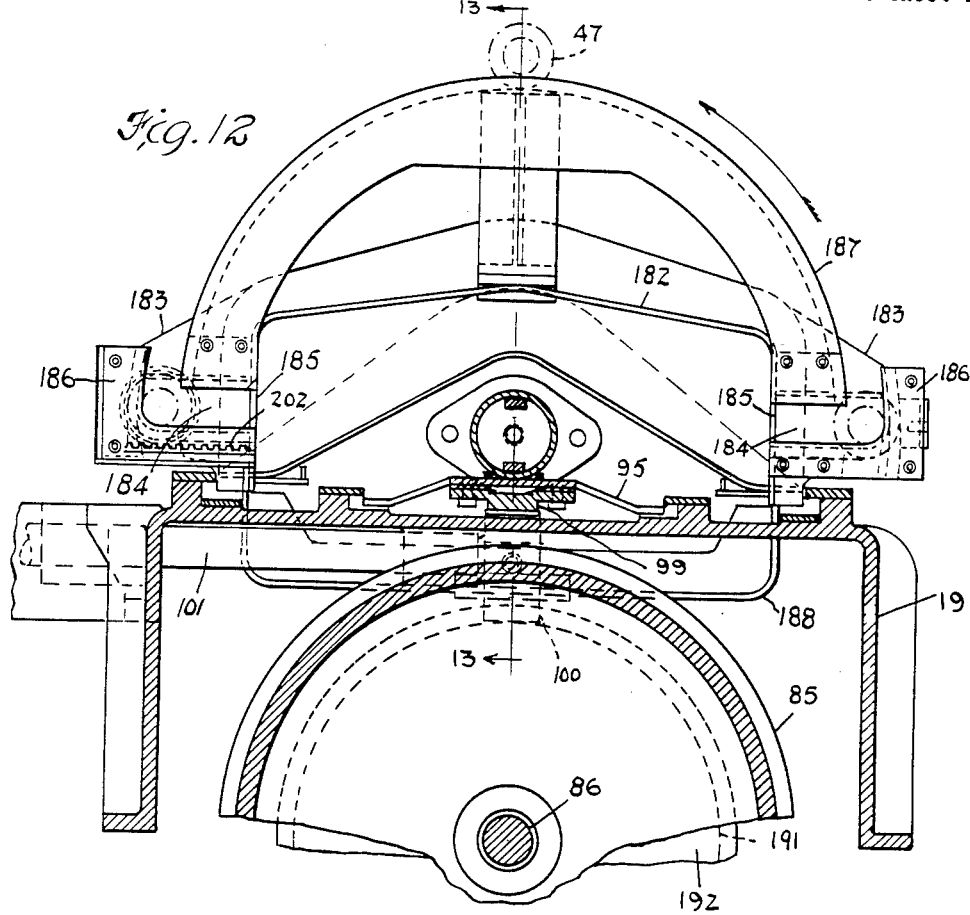
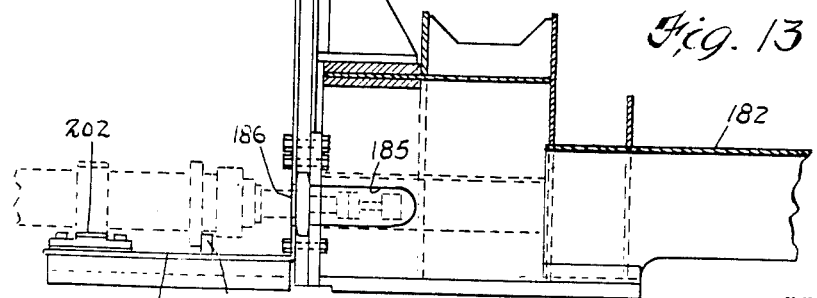
INVENTOR.
John F. Ferm
BY Fay, Oberlin & Fay
ATTORNEYS.

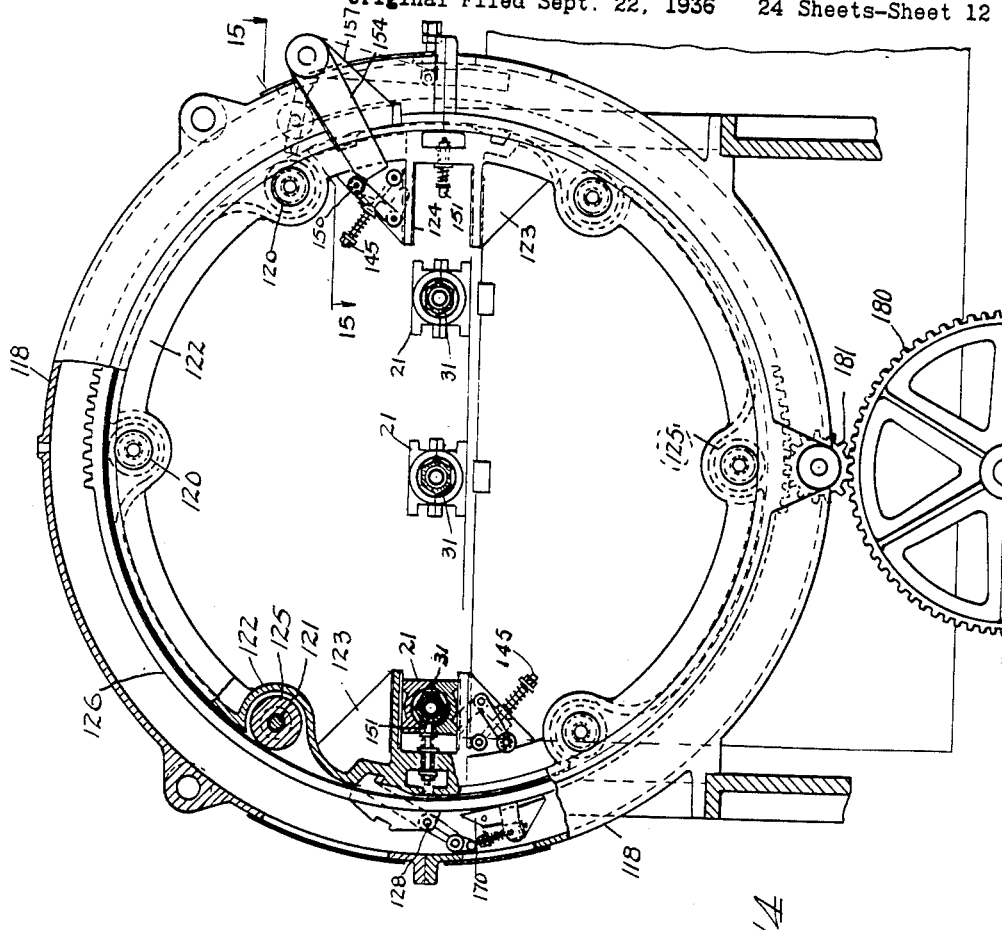
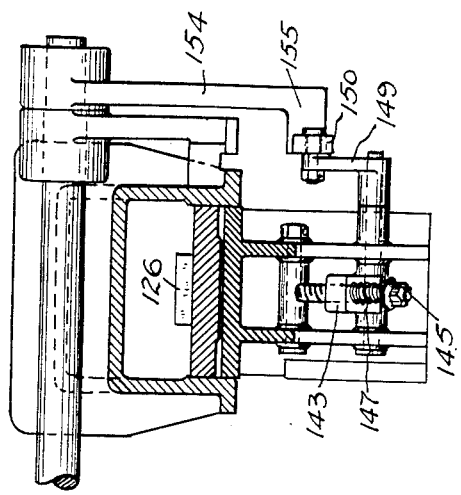

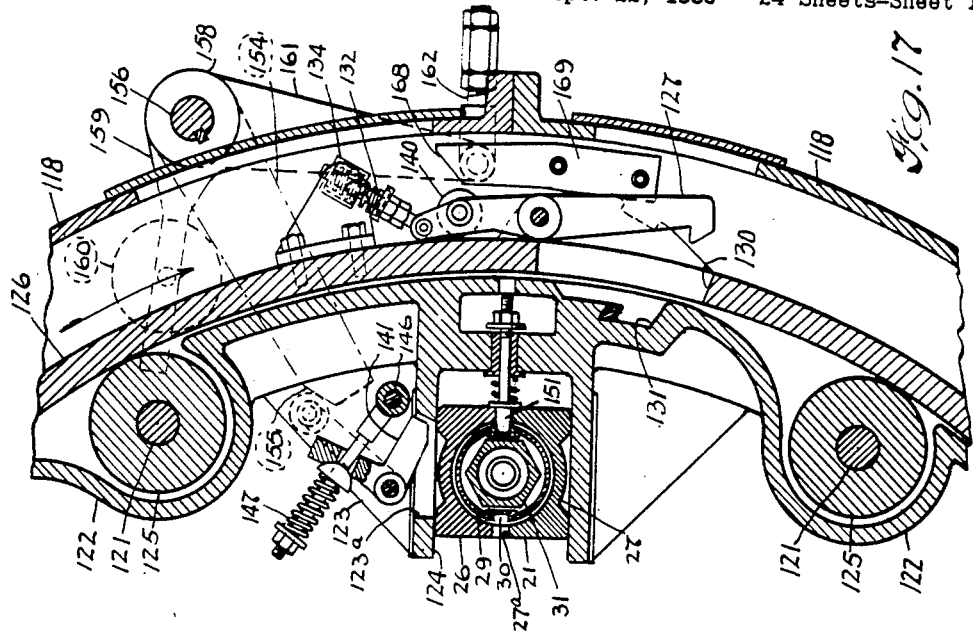
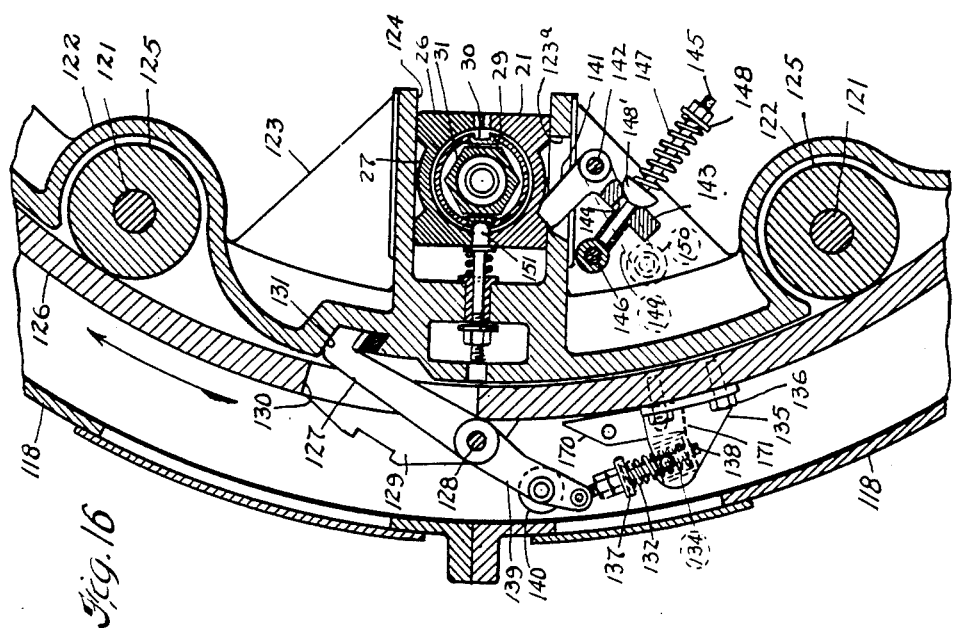

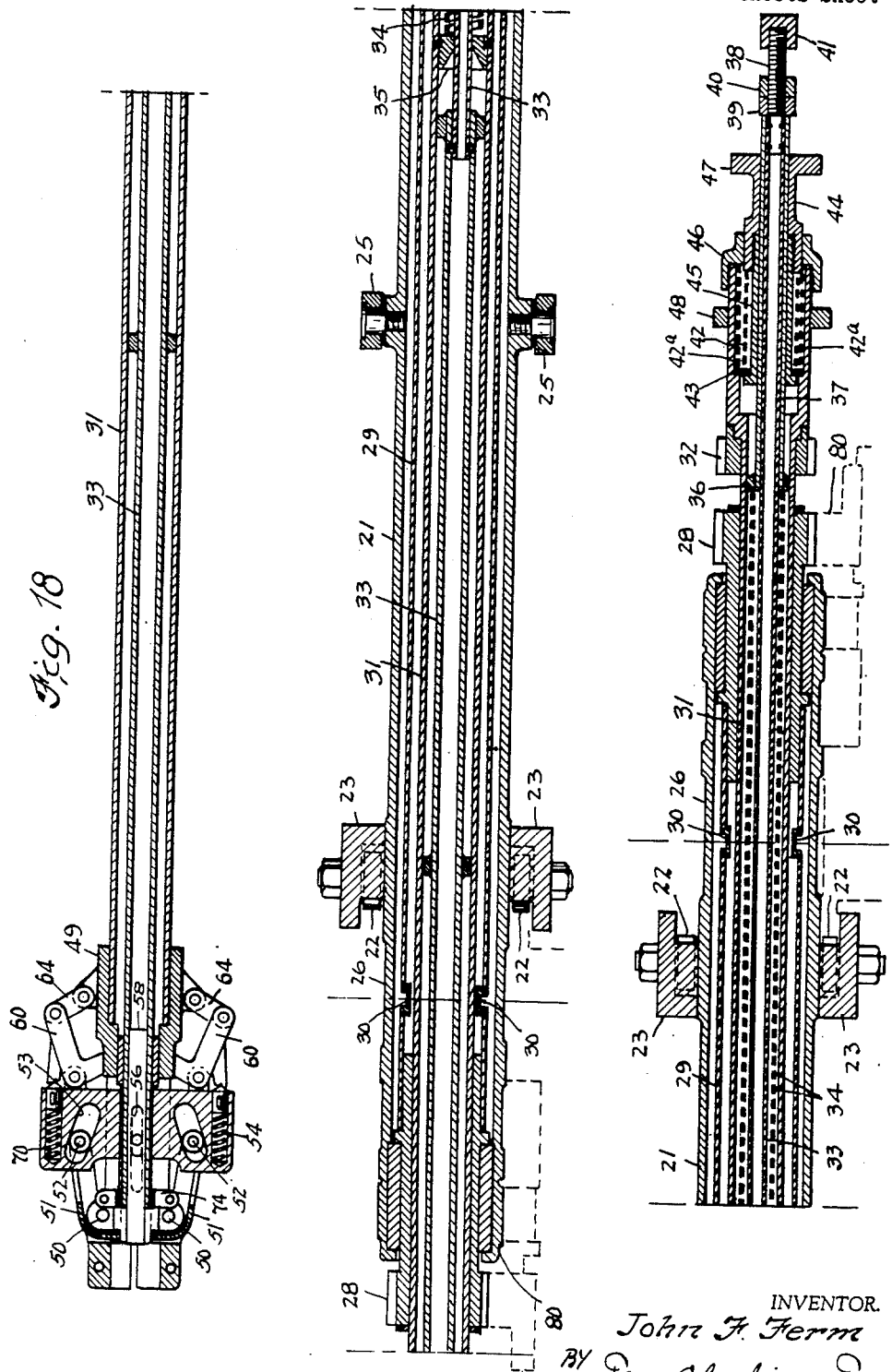

Dec. 19, 1939.  J. F. FERM  2,183,557
APPARATUS FOR MAKING ROLL-FORGED ARTICLES
Original Filed Sept. 22, 1936   24 Sheets-Sheet 15
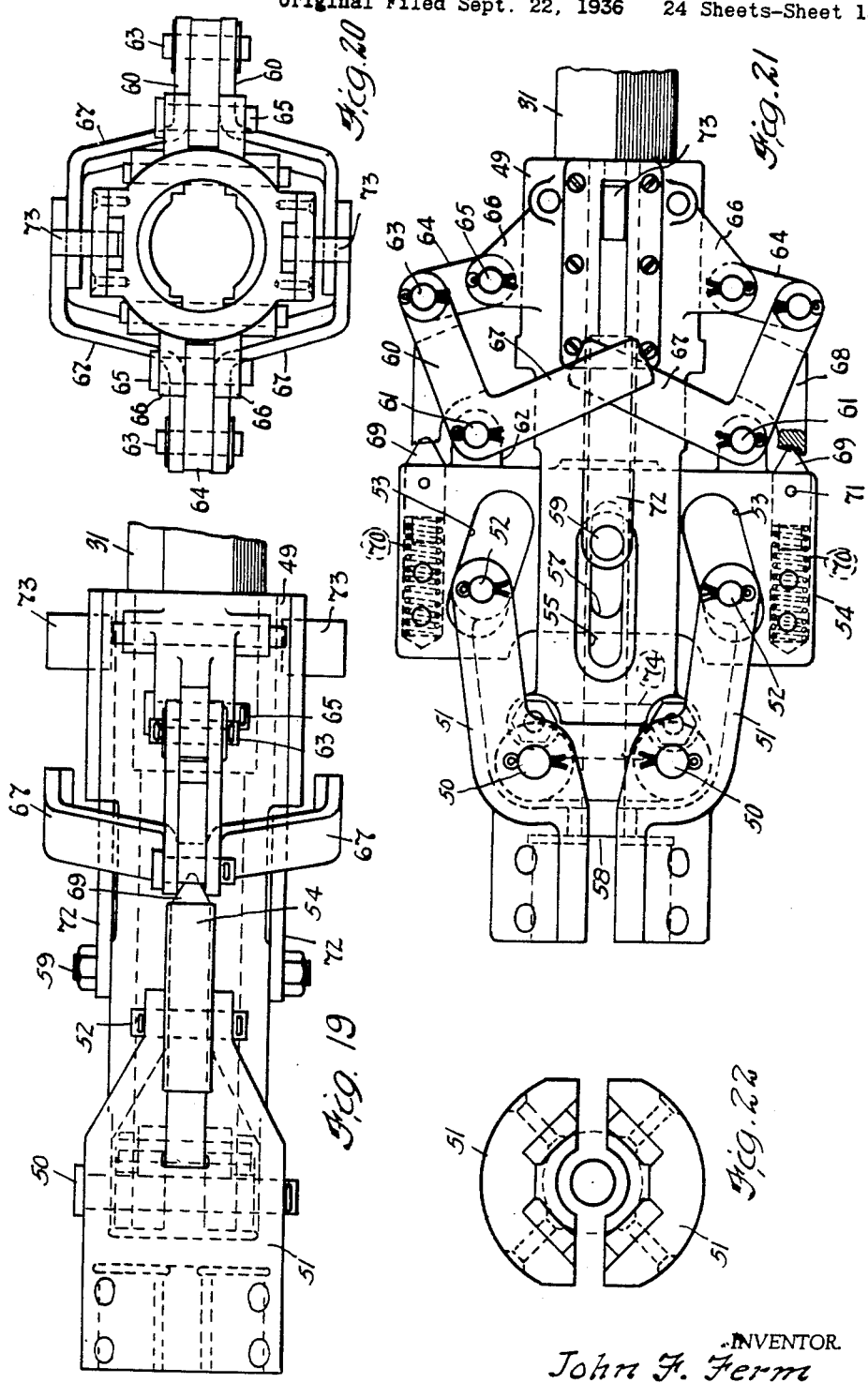

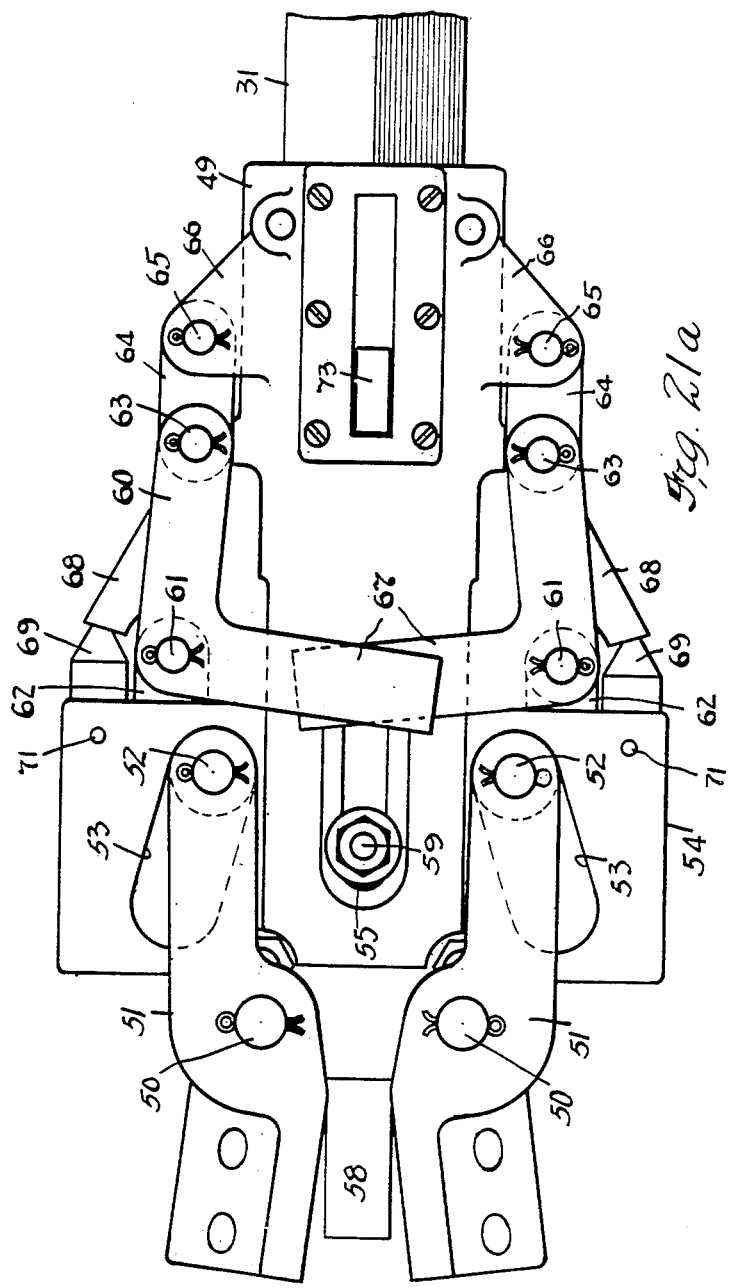

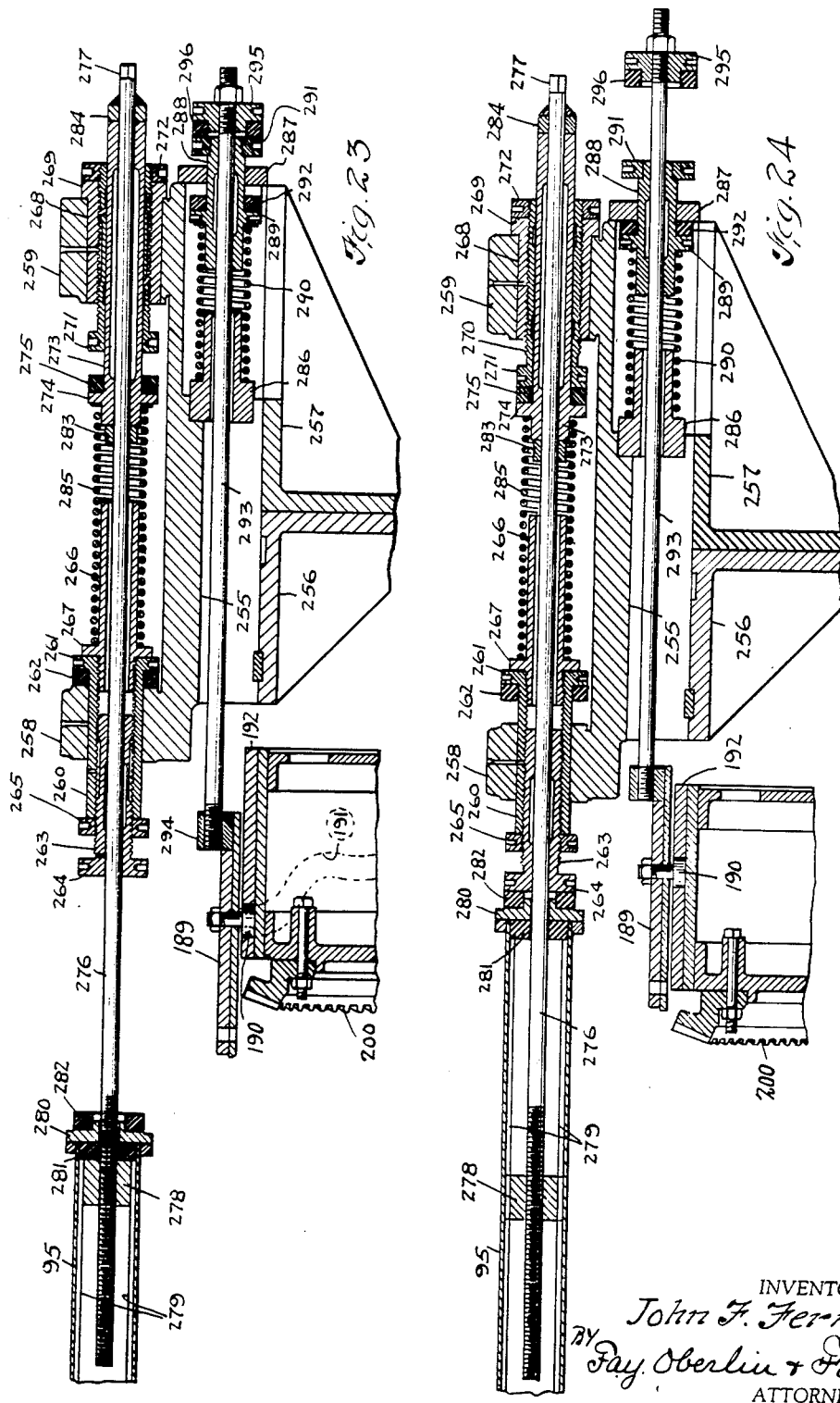

Dec. 19, 1939.   J. F. FERM   2,183,557
APPARATUS FOR MAKING ROLL-FORGED ARTICLES
Original Filed Sept. 22, 1936   24 Sheets-Sheet 18

INVENTOR.
John F. Ferm
BY Fay, Oberlin & Fay
ATTORNEYS

Dec. 19, 1939.  J. F. FERM  2,183,557
APPARATUS FOR MAKING ROLL-FORGED ARTICLES
Original Filed Sept. 22, 1936  24 Sheets-Sheet 19
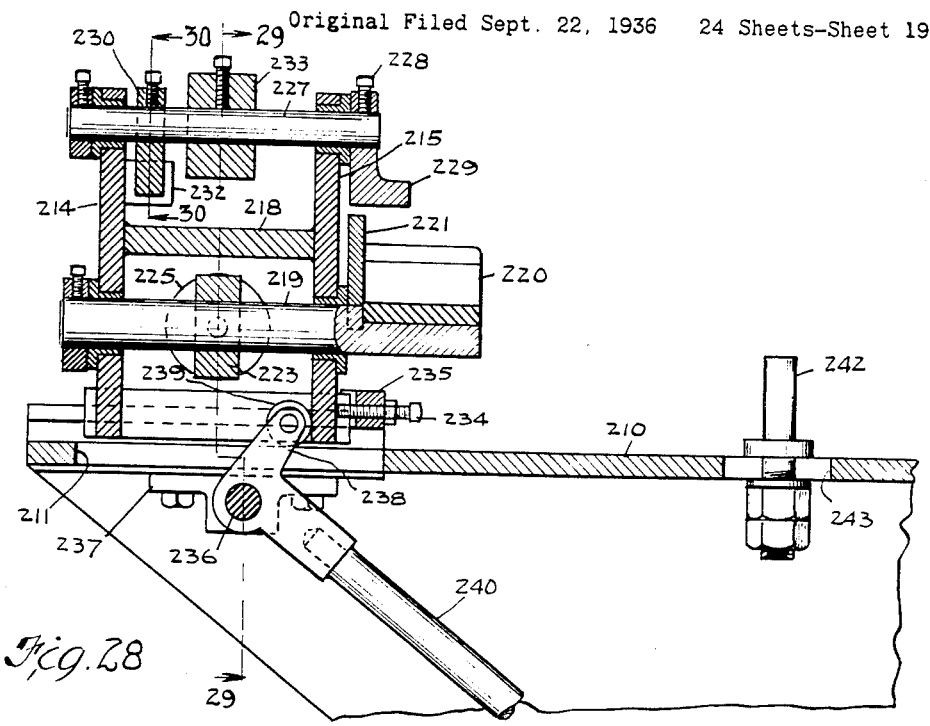
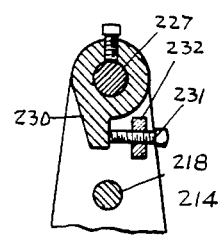
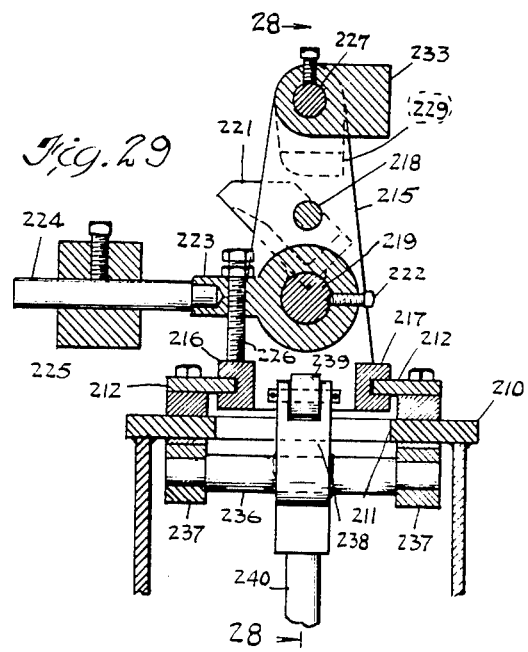
INVENTOR.
John F. Ferm
BY Fay Oberlin & Fay
ATTORNEYS.

Dec. 19, 1939.  J. F. FERM  2,183,557
APPARATUS FOR MAKING ROLL-FORGED ARTICLES
Original Filed Sept. 22, 1936   24 Sheets-Sheet 20
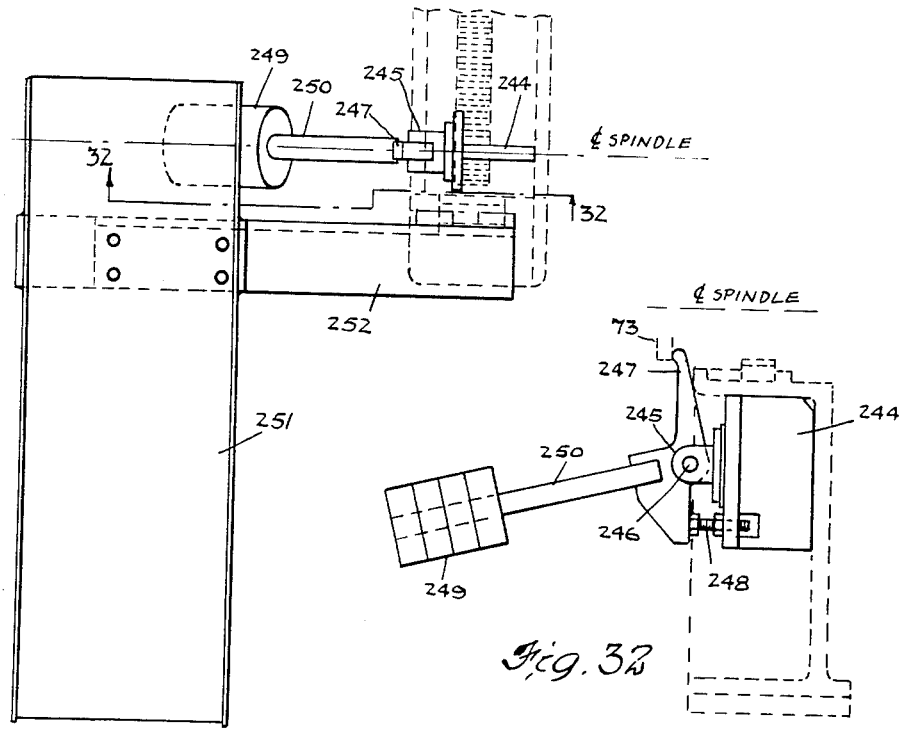
Fig. 31
Fig. 32
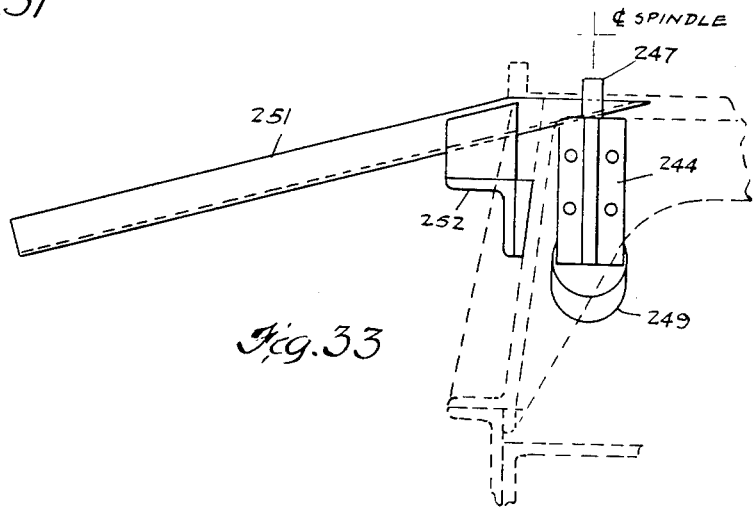
Fig. 33
INVENTOR.
John F. Ferm
BY Fay, Oberlin & Fay
ATTORNEYS.

Dec. 19, 1939.                    J. F. FERM                    2,183,557
                  APPARATUS FOR MAKING ROLL-FORGED ARTICLES
                  Original Filed Sept. 22, 1936    24 Sheets-Sheet 21

INVENTOR.
John F. Ferm
BY Fay, Oberlin & Fay
ATTORNEYS

Dec. 19, 1939.                J. F. FERM                 2,183,557
              APPARATUS FOR MAKING ROLL-FORGED ARTICLES
            Original Filed Sept. 22, 1936    24 Sheets-Sheet 22
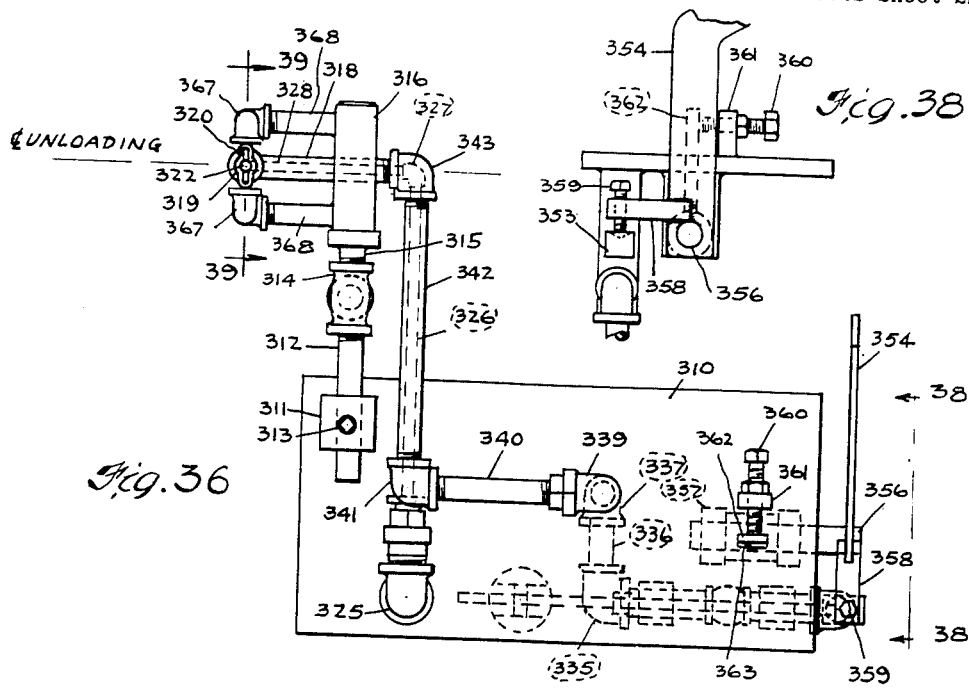
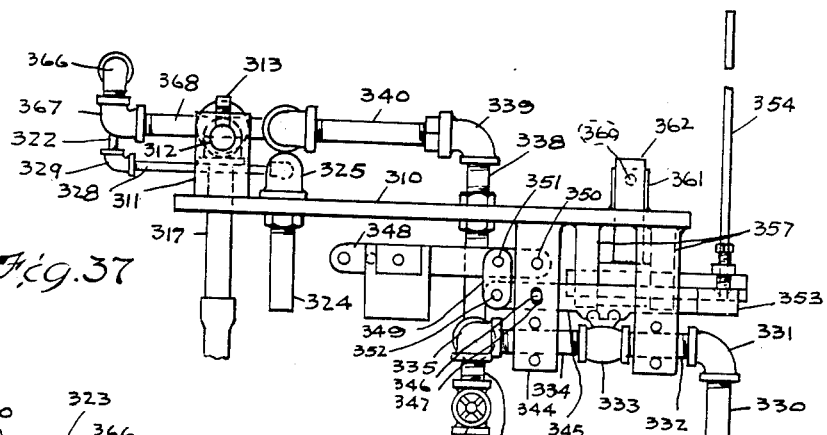
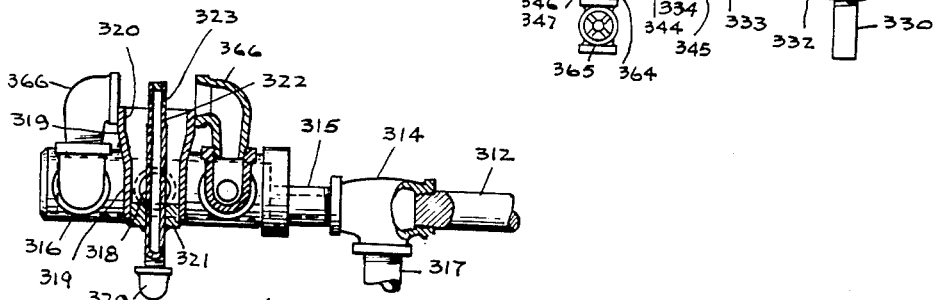
INVENTOR.
BY John F. Ferm
Fay, Oberlin & Fay
ATTORNEYS Dec. 19, 1939.  J. F. FERM  2,183,557
APPARATUS FOR MAKING ROLL-FORGED ARTICLES
Original Filed Sept. 22, 1936   24 Sheets-Sheet 23

INVENTOR.
John F. Ferm
BY Fay, Oberlin & Fay
ATTORNEYS.

Dec. 19, 1939.   J. F. FERM   2,183,557
APPARATUS FOR MAKING ROLL-FORGED ARTICLES
Original Filed Sept. 22, 1936   24 Sheets-Sheet 24

INVENTOR.
John F. Ferm
BY Fay, Oberlin & Fay
ATTORNEYS.

Patented Dec. 19, 1939

2,183,557

UNITED STATES PATENT OFFICE 2,183,557

APPARATUS FOR MAKING ROLL-FORGED ARTICLES

John F. Ferm, Midland, Pa., assignor to Mid-West Forge Company, Cleveland, Ohio, a corporation of Ohio Application September 22, 1936, Serial No. 102,008
Renewed March 17, 1939

27 Claims.  (Cl. 80—26)

This invention relates, as indicated, to apparatus for making roll-forged articles, but has reference more particularly to apparatus for automatically handling billets or bar blanks during forging thereof in roll-forging mills and the like.

Primary objects of the invention are the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Another object of the invention is to provide apparatus of the character described which is adapted to receive a bar blank that has been previously heated to a forging temperature; index the blank so as to bring it into alignment with the successive passes of the roll-forging mill, feed the blank to the successive passes of the mill as it is thus indexed, and rotate the blank about its axis in the intervals between the successive feeding movements.

Another object of the invention is to provide apparatus having means for holding the bar blank during the roll-forging operations, together with means for automaticaly opening and closing the blank-holding means.

A still further object of the invention is to provide automatically-actuated means for cooling the blank-holding means.

To the accomplishment of the foregoing and related ends, said invention, then, consists of the means hereinafter fully described and particularly pointed out in the claims; the annexed drawings and the following description setting forth in detail certain means for carrying out the invention, such apparatus disclosing, however, but one of the various ways in which the principle of the invention may be used.

In said annexed drawings:—

Fig. 3 is a view, partly in plan and partly in section, of the front portion of the apparatus, taken on the center line of the cam drums and shafting;

Fig. 4 is a view similar to Fig. 3, but showing the rear portion of the apparatus;

Fig. 5 is a central vertical longitudinal cross-sectional view of the front portion of the apparatus;

Fig. 6 is a view similar to Fig. 5, but of the rear portion of the apparatus, the loading and unloading carriage being shown in extreme rear position;

Fig. 7 is a transverse cross-sectional view through the cross-over drum, taken on the line 7—7 of Figs. 1 and 5;

Fig. 8 is a transverse cross-sectional view taken on the line 8—8 of Fig. 5;

Fig. 10 is an elevation of the right side of the apparatus, as viewed in the direction indicated by the arrows 10—10 in Fig. 4, and showing the change gears;

Fig. 11 is a transverse cross-sectional view taken on the line 11—11 of Fig. 10;

Fig. 12 is a transverse cross-sectional view, taken on the line 12—12 of Fig. 6;

Fig. 13 is a longitudinal cross-sectional view, taken on the line 13—13 of Fig. 12;

Fig. 14 is a view, partly in elevation and partly in section of one of the spindle carry-over rings;

Fig. 15 is a cross-sectional view, taken on the line 15—15 of Fig. 14;

Figs. 16 and 17 are enlarged sectional views through the spindle carry-over ring, at the loading and unloading sides respectively;

Fig. 18 is a broken view of one of the spindles;

Figs. 19, 20, 21, 21a and 22 are views of one of the chucks;

Fig. 23 is a longitudinal cross-sectional view of the bumper in its forward position;

Fig. 24 is a view similar to Fig. 23, but showing the bumper in its rearward position;

Fig. 28 is a cross-sectional view, taken on the line 28—28 of Figs. 25 and 29.

Fig. 29 is a cross-sectional view through the loading device taken on the line 29—29 of Fig. 28;

Fig. 30 is a cross-sectional detail, taken on the line 30—30 of Fig. 28;

Fig. 31 is a plan view of the unloading device;

Fig. 32 is a cross-sectional view of the unloading device, taken on the line 32—32 of Fig. 31;

Fig. 33 is an end elevation of the unloading device;

Fig. 36 is an enlarged plan view of the chuck cooling device;

Fig. 37 is a side elevation of a chuck cooling device;

Fig. 38 is an enlarged end elevation as viewed in the direction indicated by the arrows 38—38 of Fig. 36;

Fig. 39 is a cross-sectional view of the chuck cooling atomizer, taken on the line 39—39 of Fig. 36;

Although the present apparatus is capable, with suitable modification, of being employed in connection with forging machines of various types, it has been designed, in this particular case, for use in association with a roll forging mill used for making roll-forged articles, such for example, as automobile axles.

A roll-forging mill of the type fragmentarily disclosed in this application is shown and described in substantial detail in the patent to F. H. Moyer, No. 1,736,321, granted Nov. 19, 1929, and the co-pending applications of Floyd L. Scoutten, Serial No. 707,274, filed Jan. 19, 1934, and Frederick N. Ross et al., Serial No. 29,199½ filed July 1, 1935, and the description in the present case will accordingly be limited to the essential features of the mill.

Figure 1:
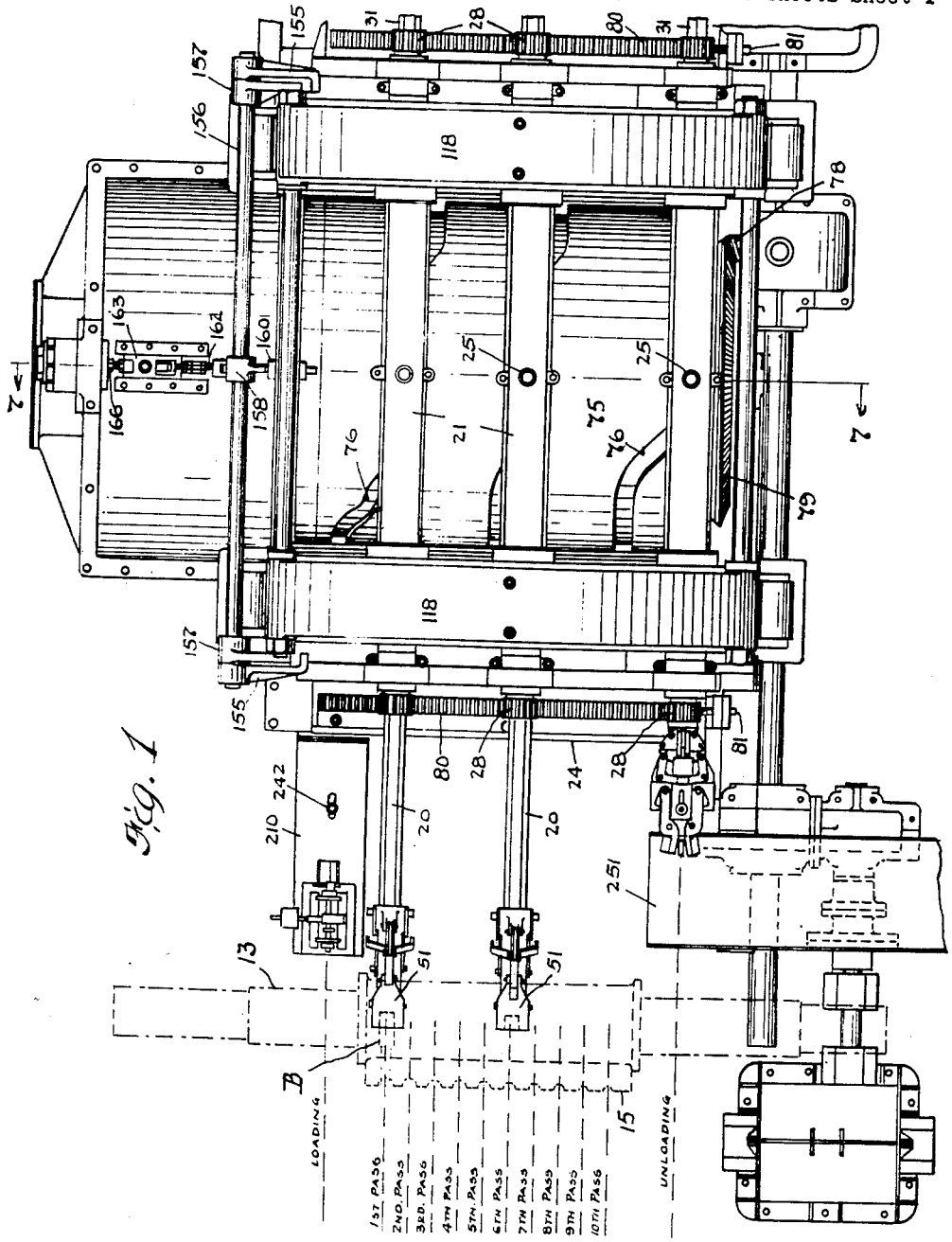
Fig. 1 is a plan view of the front portion of the apparatus.

As shown more particularly in Figs. 1 and 5, the roll forging mill comprises spaced housings, in which are journalled the upper and lower rolls 12 and 13 respectively. Rolls 12 and 13 are respectively provided with removable forging dies 14 and 15, which extend substantially 180 degrees of the circumference of the rolls to which they are secured and are arranged to cooperate to produce a forged article. Each of the dies is provided with a series of circumferential grooves, indicated only diagrammatically in Fig. 1, and the grooves in one die cooperate with the corresponding grooves in the other die to provide a plurality of passes through which a bar blank is adapted to be successively passed to produce the desired finished article. The successive passes are numerically deignated in Fig. 1.

In the use of roll-forging mills of the aforesaid character, it has heretofore been the practice for an operator to grip a heated bar blank with a pair of tongs and pass the blank between the rolls when the dies of the latter are out of pass-defining relationship, the position of the blanks or partly finished product being determined by suitable stops at the rear of the mill. With the bar blank thus positioned, and the rolls revolving in the direction indicated by the arrows in Fig. 5 the dies grip the bar and roll it outwardly towards the operator, the product being rolled to the shape of the grooves in the dies. The bar blank is given one or more passes through each set of grooves in the dies, and is also rotated upon its axis between each rolling operation so as to preclude the formation of a fin on the product at any stage of the forging thereof.

It will be noted that the foregoing operations involve the gripping of the bar blank or partly finished product by means of tongs in the hands of the operator. Such operator must necessarily be highly skilled in his duties, as he is required not only to firmly grip and manipulate the tongs during the aforesaid rolling and blank rotating movements, but to properly position the blank or partly finished product for each rolling operation. Inasmuch as it is desirable in most cases to produce the finished or substantially finished article without reheating the bar blank or partly finished product at any stage in the operations, the operator is of necessity obliged to so time his movements as to avoid undue delays. In most cases, however, it is difficult for an operator, no matter how skilled he may be, to handle the bar blanks with sufficient rapidity to entirely obviate the necessity of reheating during the operations, and in any event, speed in the direction of rapid handling of the blanks is often at the expense or sacrifice of uniformity in the contour or configuration of the finished product.

As previously stated, the present invention has as its primary objects the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Referring again to the drawings, the rolls in the present mill are driven by a suitable motor, the operation of the apparatus being synchronized with that of the mill.

Extending longitudinally in advance of the roll-forging mill are a pair of spaced supports 16 and 17, formed of structural members and providing the main supports for the apparatus to be hereinafter described. These supports carry rollers 18 (Figs. 5 and 6) which facilitate movement of the apparatus with respect to the mill when adjustment is desired.

The apparatus proper is carried by a main frame or housing 19 which rests on the rollers 18.

For convenience in describing the apparatus, it may be considered as consisting essentially of a number of elements or units as follows: spindles, chucks, spindle cross-over mechanism, spindle rotating mechanism, spindle reciprocating mechanism, spindle carry-over mechanism, loading and unloading mechanism, bumpers, chuck cooling device and operating mechanism, Each of these elements or units will now be described in detail, and the method of operation of the apparatus as a whole will then be described.

*Spindles*

Three spindles are employed in the present apparatus, construction of each spindle being as shown in Figs 1, 5, 6, 7, 8, 14, 16 and 18 and particularly the last figure.

Each spindle, designated generally by reference numeral 20, includes a housing 21, which is secured against endwise displacement as by means of rollers 22 carried by roller supports 23 affixed to the upper and lower surfaces of the housing at longitudinally spaced points, these rollers bearing against the inner edges of transverse rack supports 24 (see Fig. 5) during the cross-over movement of the spindle housings to be presently described. Intermediate its ends, the spindle housing carries at its upper and lower surfaces cam rollers 25, the function of which will also be later described. Portions of the housing, designated by reference numeral 26 in Fig. 18, are of substantially rectangular external cross-section as shown in Figs. 14, 16 and 17, and are provided with recesses 27 in their upper and lower surfaces, the side walls of which are adapted to be engaged by locking devices when the spindle housings are locked to the carry-over rings, as will be presently described. Openings 27a are also provided in the side walls of this portion of the housing. Secured within the housing 21 at the ends are pinions 28, these pinions being connected and maintained in spaced relation by means of a tube 29 brazed thereto, having at points coinciding with the centers of the portions 26 of the housing radially inwardly extending stops 30, the function of which will be later described. The pinions 28 have passages of hexagonal cross-section therethrough and extending through these passages is a spindle tube 31, the external surface of which is one of the same hexagonal shape as the passages in the pinions so that the tube may slide axially within the pinions. Secured to the tube 31 but spaced somewhat from the rear pinion 28 is another pinion 32, the function of which will presently appear. Extending through the spindle tube 31 is a tube 33 slidable longitudinally within the spindle tube but which is normally maintained in its rearmost position by means of an expansion coil spring 34 mounted on the tube and extending between a collar 35 fixed to the tube 31 and a collar 36 fixed to one end of a tube 37. The tube 33 has secured to its rear end a stud 38, to which are threadedly secured locknuts 39 and 40 and a stop nut 41. The tube 37 slides on tube 33 and by backing the nuts 39 and 40, the tension of spring 34 may be adjusted. The rear end of the spindle tube 31 is enlarged to form a housing for a coal spring 42, one end of which abuts a washer 43 and the other end a plunger 44 which is threadably secured to a plunger sleeve 45 slidably mounted on the tube 37. The plunger 44 may be actuated to permit adjustment of the tension of spring 42. The plunger 44 slides within a cap 46 threadably secured to the end of the spindle tube and is provided at its rear end with an enlarged head 47. A second spring 42a is interposed between washer 43 and cap 46. The enlarged rear end of the spindle tube likewise has welded thereto a collar 48, the function of which will presently appear.

Chucks

Each spindle is provided with a chuck, which serves to grasp and hold the blank to be forged during the roll-forging operations, and which is adapted to be periodically closed to grasp the blank and opened to release the same.

The construction of the chuck is shown in Figs. 1, 5, 18 to 22 inclusive, particularly in Figs. 19 to 22 inclusive.

Mounted on the forward end of the spindle tube 31 is a chuck body 49, provided at its forward end with transverse pins 50 upon which are pivotally mounted clamping jaws or arms 51. These jaws are provided at their rear ends with pins 52 provided with rollers which extend through inclined slots 53 in a chuck operating block 54. This block is welded to the tube 33, is slidable with respect to the chuck body 49 and has an enlarged central tubular portion which embraces the forward end of the tube 33 and has elongated slots 57 in its sides. The tube 33 is similarly provided in its sides with elongated slots 56, which are in registry with slots 57. The chuck body 49 is also provided with elongated slots 55 in its sides.

Mounted for slidable movement within the forward end of tube 33 is an ejector 58 provided with a transverse stud or pin 59 which extends through the slots 55, 56 and 57.

The chuck jaws are maintained in closed position by virtue of the fact that the spring 34, acting on the tube 33, tends to keep the block 54 in a rearward position, thereby keeping the rollers on pins 52 in the forward ends of slots 53, as clearly shown in Figs. 18 and 21.

The chuck jaws are adapted to be maintained in open position by means of toggle mechanism, which includes pairs of bell crank levers 60, pivoted as at 61 to lugs 62 at the rear of block 54. These levers are pivoted as at 63 to links 64, which are in turn pivotally connected as at 65 to lugs 66 extending from the chuck body. The arms 67 of these levers are bent outwardly so as to clear the chuck body and are crossed at their ends at the sides of said chuck body. Each pair of levers has welded thereto a member 68 which is adapted to engage a plunger 69 slidably mounted within recesses at the top and bottom of the block 54. Each plunger is normally maintained in its outermost position by means of a coil spring 70 disposed with the plunger recess and bearing against the inner end of the plunger. Each plunger is longitudinally slotted and a pin 71 extends through this slot so as to limit the extent of movement of the plunger.

It will be apparent from Fig. 21a that the pivots 63 are below a line joining pivots 61 and 65 and the toggle formed by the levers 60 and links 64 will therefore be easily maintained by the plungers 69. The jaws will therefore remain in open position, as shown, the opening of the jaws having been effected by means which will be described in connection with the operation of the apparatus.

For the purpose of ejecting the finished article from the chuck jaws at the time these jaws are opened the ejector 58 is adapted to be actuated. For this purpose, the stud 59 has secured to each end thereof a bar 72, each of which is longitudinally slidable within the chuck body 49 and is provided at the rear with a laterally extending member 73, the function of which will hereinafter appear. A tubular guide 74 is secured to the chuck body 49 and serves to guide and support the forward end of tube 33 during movement of the latter.

Spindle cross-over mechanism

For the purpose of indexing the spindles or causing them to be moved transversely of the housing and into axial alignment with the successive passes of the mill, mechanism is provided which is best shown in Figs. 1, 3, 5 and 7.

This mechanism includes a cylindrical cam drum 75 having a cam groove 76 in its periphery, and into which the cam rollers 25 extend, so that rotation of the drum causes the spindles to move transversely of the housing, the spindle housings remaining stationary when aligned with the successive passes and during the loading, forging and unloading operations.

The drum 75 is mounted for rotation about a shaft 77 extending transversely of the frame 19 and is rotated in the direction indicated by the arrow in Fig. 5, as by means of a bevel gear 78 which drives a bevel ring gear 79 secured to one end of the cam drum. The bevel gear 78 is an element of the operating mechanism to be later described.

Spindle rotating mechanism

Mechanism is also provided for rotating the spindles about their axes coincidentally with the indexing or movement of the spindles into alignment with the successive passes formed by the rolls. Such mechanism is best illustrated in Figs. 1, 2, 5, 8 and 18.

Referring to these figures, it will be seen that the frame 19 of the apparatus is provided with transverse supports 24 to which are secured racks 80 with which the pinions 28 of the spindles are in engagement, these racks being adjustable endwise by means of screw bolts 81 (Fig. 8). These racks extend substantially the entire width of the frame 19.

During the indexing movements, the spindles, by virtue of the engagement of the pinions with the racks, will be rotated about their axes, the extent of rotation between passes being 90°, so that the formation of a flash on the blank being forged is avoided and uniformity in the forged articles secured.

Spindle reciprocating mechanism

For the purpose of reciprocating the spindles as they become aligned with each pass of the rolls, mechanism is provided which is shown most clearly in Figs. 2, 3, 4, 5, 6, 9, 10, 11 and 41.

Referring to these figures, it will be seen that there is provided a spindle reciprocating drum 85, which is rotatable about an axis transverse to that of the cam drum 75. This drum is mounted for rotation about a shaft 86 carried by transverse frame members 87 and 88, and is provided in its peripheral surface with cam grooves 89 and 90. The groove 89, during rotation of the cam drum, causes the spindles to reciprocate and is so formed as to impart a relatively short stroke to the spindle, such as is required for forging relatively short articles, whereas the groove 90 is adapted to impart a longer stroke, as required for forging longer articles, such as axles and the like, it being understood that only one of the grooves is utilized at a time.

The cam drum 85 is rotated in synchronism with the drum 75 by mechanism which comprises bevel gears 91, 92, 93 and 94, the latter being in the form of a ring secured to one end of the drum.

Mounted on the frame of the apparatus for sliding movement longitudinally thereof is a spindle carriage 95, the front end of which is formed to provide a transversely extending head 96 having an open-ended recess 97. Secured to the upper and lower walls of this recess are spindle guides 98 which form a track for the head 47 of the spindle plunger 44 during the indexing of the spindles.

Secured to the lower surface of the spindle carriage is a rack 99 which is engaegd by a pinion 100 mounted on one end of a shaft 101, to the opposite end of which is secured a pinion 102. Pinion 102 is driven by an idler gear 103, rotatably mounted on a lever 104, one end of which is pivoted to the shaft 101 and the other end of which is held in fixed position by a pin 105. The pin 105 extends into one of a multiplicity of openings 106 in a bracket 107 secured to the frame of the apparatus. The gear 103 is in turn driven by a gear 108 mounted on a shaft 109 which is journalled in the frame and is driven by a gear 110 at its opposite end. The gear 110 is rotated by a rack 111 mounted on a longitudinally slidable crosshead shoe 112, which carries a crosshead 113. Crosshead 113 carries a pin 114 provided at its inner end with a cam roller 115 which extends into cam drum groove 89. When the cam roller is to extend into the groove 90, the crosshead is moved from the position shown in solid lines in Fig. 10 to the position indicated by the dotted lines in such figure.

It will be understood from the foregoing description that rotary movement of the cam drum 85 will be translated into reciprocatory movement of the spindle whereby the blanks mounted in the chucks carried by the spindles will be roll-forged as already described.

In order to vary the speed of the reciprocations of the carriage as required by differences in the diameter of the forging dies, the gear 108 may be replaced by gears of various diameters and to accommodate such changes, the lever 104 may be moved about its pivot and the pin 105 secured in any one of the openings 106 in the bracket 107, a multiplicity of such openings being provided in order to permit a large variation in the sizes of change gears. The lever is slotted as at 116 to allow movement of the pin 105 during such changes and the lever is further provided with a handle 117 to facilitate shifting of the lever.

Spindle carry-over mechanism

For the purpose of returning the spindles to their starting position, after each spindle has completed its cycle of movements and following the unloading of the forged article from the chuck thereof, mechanism is provided which is termed "spindle carry-over mechanism", and is best disclosed in Figs. 1 to 10, and 12 to 17 of the drawings.

Disposed longitudinally of the apparatus at points spaced to correspond with the portions 26 of the spindle housings are circular housings or covers 118, which are mounted upon and secured to the frame 19 in any suitable manner. the housings being made in sections divided along a central horizontal plane so as to permit removal of the upper sections from the lower ones, when the mechanism is to be inspected or repaired. These housings have inwardly extending flanges 119, the ends of which form tracks for rollers 120 revolubly mounted on the ends of pins 121 secured to rotatable circular spindle carriers 122.

Each spindle carrier 122 is provided at diametrically opposite points with inwardly extending brackets 123 which are recessed as at 124 to receive the squared portions 26 of the spindle housings, and is also provided with rollers 125 revolubly mounted on the pins 121.

Encircling each of the spindle carriers is a ring gear 126, whereby the carrier is adapted to be periodically rotated 180° to carry the spindle housing to its initial position. At such times that the carrier is not being rotated, the ring gear 126 merely rolls on the rollers 125.

When the carrier is to be rotated, the gear 126 is locked to the carrier in the manner shown in Figs. 14 and 17, wherein the various parts are shown as ready for the carry-over movement. For this purpose, a pawl 127 is provided which is pivotally mounted on a pin 128 carried by lugs 129 extending from the ring gear at opposite sides of the periphery thereof. The pawl extends through an opening 130 in the ring gear, the inturned forward end of the pawl extending into a recess 131 in the periphery of the spindle carrier.

The pawl is normally urged into the aforesaid position by means of coiled springs 132, the lower ends of which are seated in spring seats 134 pivotally mounted in a bracket or support 135, secured to the ring gear as by bolts 136. The upper ends of the springs 132 engage washers 137 adjustably mounted on bolts 138 which are pivotally secured to extensions 139 of the pawls 127. The extension 139 of the pawl also carries a roller 140.

After the spindle housing enters the recess 124 in the carrier, as shown in Fig. 17, it is latched to the carrier by the engagement of a latch 141 with one of the side walls of the recess 27 in the spindle housing, this latch extending through an opening 123a in the bracket 123. This latch forms one arm of a bell crank lever, which is pivotally secured to the bracket 123, as by a pin 142, the other arm 143 of the lever having an opening 144, through which a bolt 145 extends. The bolt 145 is pivoted on the bracket 123, as by a pin 146 extending through the head thereof. The latch is normally maintained in latching position by means of a coil spring 147 which is mounted on the bolt 145, between a washer 148 and a hemispherical washer 148' slidably mounted on the bolt and engaging the arm 143 of the latch lever. As the spindle housing moves past the latch 141, the latter is momentarily depressed against the action of spring 147.

The pin or shaft 142 on which the latch lever is mounted has keyed thereto a lever 149, which carries at its free end a roller 150. A spring-pressed plunger 151, mounted in the spindle carrier, extends through one of the openings 27a in the spindle housing and into one of the stops 30. Since the stops 30 are welded to tube 29, which in turn is brazed to pinions 28, and since the tube 31 is not rotatable with respect to the pinions 28, it will be apparent that the plunger 151, by preventing rotation of the tube 29, will also serve to prevent rotation of the spindle tube 31 with respect to the housing 26, during the carry-over of the spindle, as will be later described. The plunger 151 also urges the spindle housing against the latch 141 after such housing has moved to the position in which latching is effected, and thus aids in maintaining the spindle housing against movement relatively to the carrier during the carry-over.

The latches 141, immediately prior to the end of the carry-over movement, are released from engagement from the spindle housing in the manner shown in Fig. 17.

For this purpose there are provided levers 154, having a bevel 155 at one end, the other ends of these levers being keyed to a rock shaft 156 which is journalled in brackets 157 secured to the housing 118. The shaft 156 has keyed thereto intermediate its ends, a bell-crank lever 158, one arm 159 of which carries an adjustable counterweight 160 and the other arm 161 of which is secured at its lower end to one end of a clevis 162. The other end of this clevis is secured to a slide 163, mounted on the frame of the apparatus for slidable movement transversely thereof. The slide 163 has mounted on the lower surface thereof a cam roller 164.

The counterweight 160 normally maintains the levers 154 in such position that they do not in any way interfere with the spindle carriers during the carry-over movement of the latter. As the spindle carriers approach the position shown in Fig. 17, however, a cam 165, which is mounted on the cam drum 75, strikes the cam roller 164 and forces the slide 163 towards the left, as viewed in Fig. 7, thereby moving the levers 154 upward to the position shown in Figs. 14 and 17, so as to bring their beveled ends 155 into the path of rollers 150. As the rollers 150 strike the beveled ends 155 of the levers 154, the levers 149 are elevated, thereby causing the latches 141 to be withdrawn from engagement with the spindle housing, and permitting the latter, in turn, to be withdrawn from the recesses 124 in the carrier brackets 123. After the cam 165 moves past the cam roller 164, the counterweight 160 causes the parts to return to their normal position and the springs 147 again force the latches 141 to their normal latching position. The movement of the slide 163 to the right, as viewed in Fig. 7, is limited by engagement of a stop member 166 on the slide with an abutment 167 on the frame of the apparatus.

Upon completion of the carry-over movement, that is to say, just as the spindle carrier has completed its movement through an arc of 180° and to the position shown in Fig. 17, the rollers 140 on the pawl extension 139 strike the beveled end 168 of a cam 169, which is mounted on the housing 118, thereby moving such roller inwardly towards the gear 126, and causing the pawl 127 to turn on its pivot 128 and be withdrawn from engagement with the spindle carrier, as shown in Fig. 17. As the pawl turns on its pivot, the point of pivotal connection between the pawl extension and bolt 138, which is in effect the center of a toggle consisting of these elements, moves inwardly past a line drawn through the axis of roller 140 and the pivotal mounting of spring seats 134. The springs 132, during such movement are momentarily compressed and then expand, so that the pawl is thereafter securely held in its retracted position. The spring seats 134 have openings in their bottoms to accommodate movement of the bolts 138 during compression of the springs 132.

The ring gears, after release of the pawls 127 from engagement with the spindle carriers, as described, are rotated 180° in the opposite direction, so as to return the ring gears to their original position, as shown in Fig. 16. As the gears reach the end of this movement, the rollers 140 strike the beveled ends 170 of cams 171 which are secured to the housings 118, thereby causing these rollers to move outwardly and the pawls 127 to move into driving engagement with the spindle carriers, as shown. It will be apparent that the spindle carriers remain stationary during the aforesaid return movement of the ring gear so as to permit the spindle housings to be withdrawn from the carriers at one side and received thereby at the other side.

Oscillation of the ring gears, as described, is effected by mechanism which will now be described.

Such mechanism is most clearly shown in Figs. 3, 5, 7, 14 and 40, and comprises a slide 172, disposed below the cam drum 75 and mounted for reciprocal movement transversely of the frame of the apparatus. This slide is provided at one end with a rack 173 and has secured to its opposite end a longitudinally adjustable carrier 174 for a cam roller 175 disposed in cam grooves 176 in the periphery of cam drum 75. Rotation of the cam drum results in reciprocal movements of the rack 173 which are translated into oscillation of the ring gears 126.

The rack 173 is in driving engagement with a pinion 177 keyed to a shaft 178 journalled in bearings supported by a transverse frame member 179 of the apparatus. This shaft, in turn, has keyed to its ends gears 180, which are in driving engagement with smaller gears 181, journalled on pins 182 mounted in the lower portion of housings 118. The gears 181, in turn, drive ring gears 126.

*Loading and unloading mechanism*

The loading and unloading mechanism is best disclosed in Figs. 2, 6, 9, 10, 11, 12 and 13 of the drawings.

It comprises a carriage 182, slidably mounted on the frame of the apparatus for reciprocal movement longitudinally thereof. This carriage is in the form of an inverted V-shaped housing, which, for a portion of its length, is disposed above the spindle carriage 95. The carriage 182 is provided at its forward end with laterally extending portions 183, providing guides 184 for the rear ends of the spindles, the carriage having elongated slots 185 in its sides through which the rear ends of the spindles pass in their movement into and out of these guides. The front faces of the portions 183 of the carriage have secured thereto cover plates 186 which engage the front face of the head 47 of the spindle when the rear end of the spindle is disposed in the guide 184, so as to move the spindle bodily when the carriage 182 is moved rearwardly. In order to similarly hold the spindle in retracted position during the carry-over, as well as to support the rear end of the spindle during such movement, the carriage 182 has secured to its forward end a semi-circular track 187, which is of a width just sufficient to receive the head 47 of the spindle.

The carriage 182 is further provided adjacent its rear end with a shallow U-shaped member 188 (Figs. 6 and 12), to which is secured a support 189 for a cam roller 190. This roller is disposed in cam groove 191 of a cam drum 192. Cam drum 192 is mounted for rotation about an axis extending longitudinally of the apparatus, that is, about a shaft 193, secured in transverse frame members 194 and 195. The drum is continuously rotated through the intermediary of bevel bears 196 and 197, stub shaft 198, bevel gear 199 and bevel ring gear 200, the last-named gear being rigidly secured to the end of the drum.

The cover plate 186 at the loading side of the carriage 182 has extending forwardly from its lower edge a support 201 upon which is mounted a short transversely extending rack 202 and an upstanding stop 203, the latter disposed below the center of the axis of the spindle when in loading position, and adapted to be engaged by the rear face of the collar 48 of the spindle when in such position.

Secured to the frame of the apparatus at the unloading side of the carriage is a bracket 204, which carries at its upper end and in alignment with the spindle when in unloading position a stop 205, which is in the form of a pin. This stop is adapted to be engaged by the stop nut 41 of the spindle during the unloading operation, as will be later described, and it will be understood that an opening 206 (Fig. 9) is provided in the rear wall of the extension 183 to permit such engagement. A second stop member is also provided, which is in the form of a bracket 207 secured to the side of extension 183 at the unloading side of carriage 182, this bracket having at its forward end an inwardly projecting stop 208 adapted to be engaged by the front face of collar 48 of the spindle when the spindle is in unloading position.

The loading mechanism further includes the devices shown in Figs. 25 to 30 inclusive, and the unloading mechanism further includes the devices shown in Figs. 31, 32 and 33 of the drawings.

Referring to Figs. 25 to 30, there is disclosed a support 210, which as shown in Fig. 1, is secured to the front end of the frame of the apparatus at the loading side thereof. This support has a rectangular opening 211 in its forward portion and has secured thereto at opposite sides of this opening, guide bars 212 for a longitudinally slidable carriage 213. This carriage comprises end members 214 and 215, which are interconnected at their bases by means of spaced guides 216 and 217, into which the guide bars 212 extend, and at their centers by a bar 218. These end members have journalled therein a shaft 219, which carries at its rear end a V-shaped billet support 220, the support being welded to the shaft, so as to form in effect an integral part thereof, being provided at its forward end with an end stop 221.

Secured, as by set screws 222, to shaft 219 intermediate its ends is an arm 223 having an extension 224 on which is mounted a longitudinally adjustable counterweight 225. A cap screw 226 extends through the arm 223 and into engagement with the guide 216, this cap screw serving to determine the normal position of the billet support 220, as shown in Fig. 29. When the billet on support 220 is moved towards the right as viewed in Fig. 29, the billet support is tilted, but after the billet has moved sufficiently to clear the support, the counterweight 225 causes the support to return to its normal position.

The end members 214 and 215 also have journalled therein a shaft 227, to the rear end of which is secured, as by a set screw 228, a billet clamp 229, this clamp being disposed above the billet support 220 and cooperating with the latter in holding the billets pending the loading operations. The normal position of this clamp, shown in dotted lines in Fig. 29, is determined by the engagement of a stop 230 on the shaft 227 with a cap screw 231, which is in threaded engagement with a lug 232 extending from end member 214, the stop being normally maintained in such engagement with the screw 231, through the medium of a counterweight 233 secured to the shaft 227 intermediate its ends. On lateral movement of the billet from the support 220, the clamp 229 will be tilted to a slight degree, but will be returned to normal position by the weight 233.

The normal position of the carriage is shown in Fig. 28, and is determined by the engagement of the end member 215 with an adjustable cap screw 234 carried by a transversely extending member 235 of the support 210. For the purpose of maintaining the carriage in such normal position, a bell-crank lever is provided, which is secured to a transverse shaft 236 journalled in bearings 237 carried by the support 210. One arm 238 of this lever is provided with a roller 239, and the other arm 240 of this lever is provided with counterweights 241, whereby the roller 239 normally bears against the inner face of end member 215 to thus hold the carriage in its normal position. The carriage may of course be moved forwardly and against the action of weights 241, such movement occurring during the loading operation to be later described.

The support 210 is further provided with an upstanding pin 242, which extends through an elongated opening 243 in such support, whereby the position of the pin longitudinally of said support may be adjusted. The function of this pin will be later described.

Referring to the unloading device referred to in Figs. 31, 32 and 33, there is disclosed a support 244, which is secured adjacent the front end of the frame of the apparatus at the unloading side thereof. This support has secured to the front face thereof a bearing 245 for a pin 246, upon which is mounted for pivotal movement an arm 247, the upper end of which is at times adapted to abut one of the lateral members 73 of the chuck. The normal position of this arm is determined by the abutment of the lower end thereof with a cap screw 248 which is mounted on the support 244, the arm being maintained in normal position by counterweights 249 mounted on an extension 250 of the arm.

After the forged article has been ejected from the chuck, it drops on an inclined chute 251 which is supported by an angle 252 secured to the side of the frame adjacent the unloading device.

Bumpers

In order to cushion the movements of the spindle and loading and unloading carriages, as well as for certain other purposes, bumpers are provided, the construction of which is most clearly shown in Figs. 2, 6, 23 and 24.

For the purpose of mounting these bumpers, there is provided a housing 255, which is secured to a transverse portion 256 of the carriage support and bracket 257 which extends rearwardly of the carriage support and is bolted thereto. Housing 255 is provided with longitudinally spaced upstanding ears 258 and 259 which form a support for the spindle bumper. Mounted for slidable longitudinal movement in the ear 258 is an internally threaded sleeve nut 260 having a head 261, between which and the ear 258 is disposed a rubber washer 262. This nut is in threaded engagement with an externally threaded adjusting sleeve 263, having a head 264. After the head 264 has been adjusted to the desired position, the sleeve 263 is locked to the nut 260 as by a locknut 265. Secured to the opposite end of nut 260 is a sleeve 266 having a flange 267, which is in engagement with the head 261 of the nut.

Mounted within the ear 259, but fixed with respect thereto, is a sleeve holder nut 268 provided with a head 269. Threadedly secured to this nut is a sleeve holder 270 having a head 271 at one end. The relation between the nut 268 and holder 270 is fixed as by means of a locknut 272. Slidably mounted within holder 270 is a sleeve 273 having a flange 274 adjacent one end, between which and head 271 is interposed a rubber washer 275.

Extending through sleeves 263, 266 and 273 is a rod or bolt 276 having a squared end 277, and threaded at its other end. The threaded end of the bolt extends into the tubular rear end of spindle carriage 95 and is secured to a nut 278 which is slidable within the carriage, but prevented from rotating by keyway guides 279. Secured to the rear open end of carriage 95 is a gland 280, at the inner face of which is disposed a rubber washer 281 and at the outer face a similar rubber washer 282. The position of the sleeve 273 on the bolt 276 is fixed as by means of a sleeve 283 pinned to the bolt and engaging the forward end of the sleeve 273, and a sleeve 284 which engages the other end of sleeve 273. Interposed between flange 267 of sleeve 266 and flange 274 of sleeve 273 is an expansion coil spring 285.

The loading and unloading carriage bumper includes a spring seat 286 which is secured to the housing 255 and a cover plate 287 secured to the end of the housing. The cover plate has slidably mounted therein a sleeve 288 having a flange 289, between which and the spring seat 286 is interposed an expansion coil spring 290. Threadedly secured to one end of the sleeve 288 is a nut 291 and interposed between flange 289 and the cover plate 287 is a rubber washer 292. Extending through the spring seat 286 and sleeve 288 is a rod or bolt 293, one end of which is secured to an upstanding ear 294 on the support 189 for the cam roller 190. Secured to the rear end of this bolt is a nut 295, to the inner face of which is secured a rubber washer 296.

The action of the bumpers will be later described in connection with the description of the operation of the apparatus.

Figure 2:
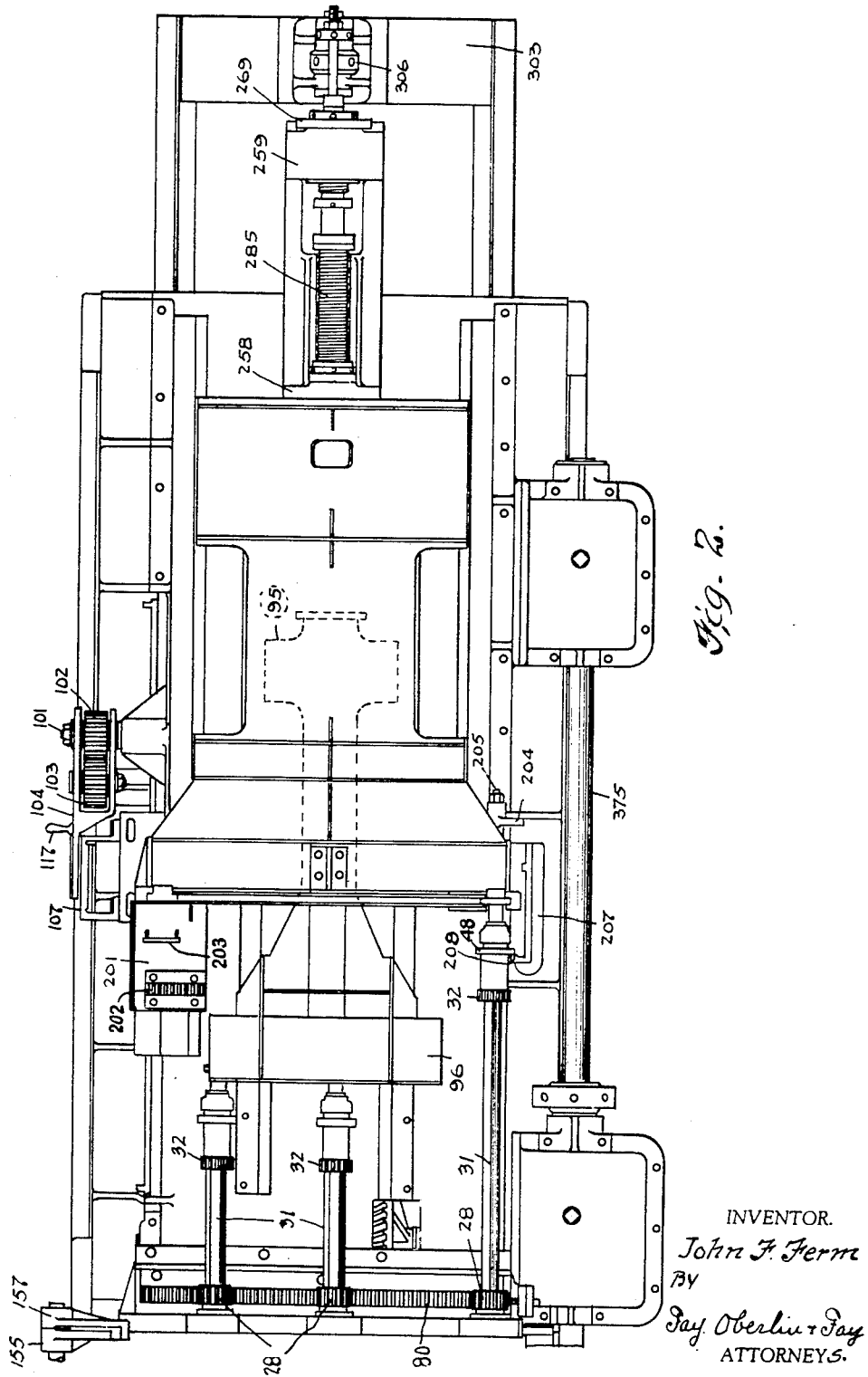
Fig. 2 is a plan view of the rear portion of the apparatus.
Figure 9:
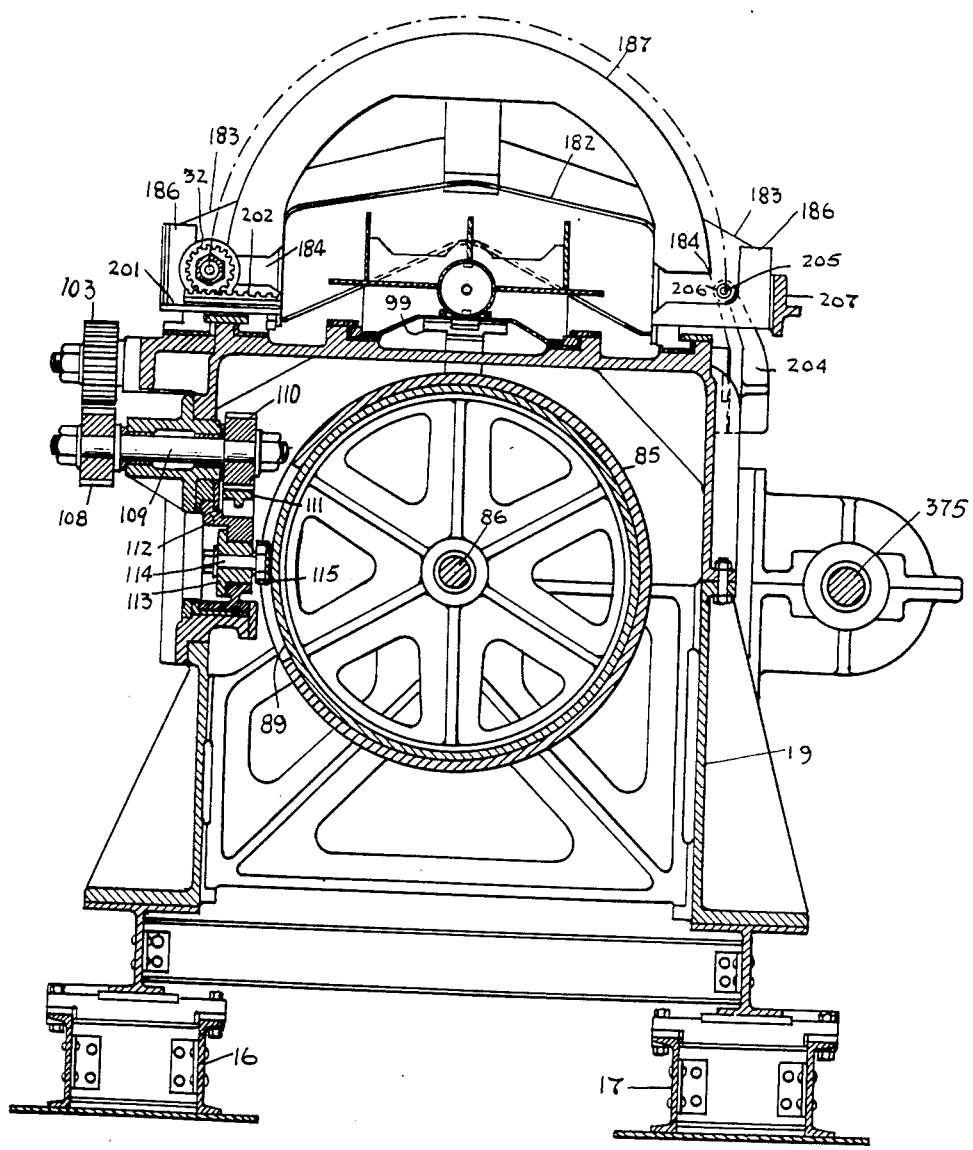
Fig. 9 is a transverse cross-sectional view, taken on the line 9—9 of Figs. 4 and 6.
Figure 25:
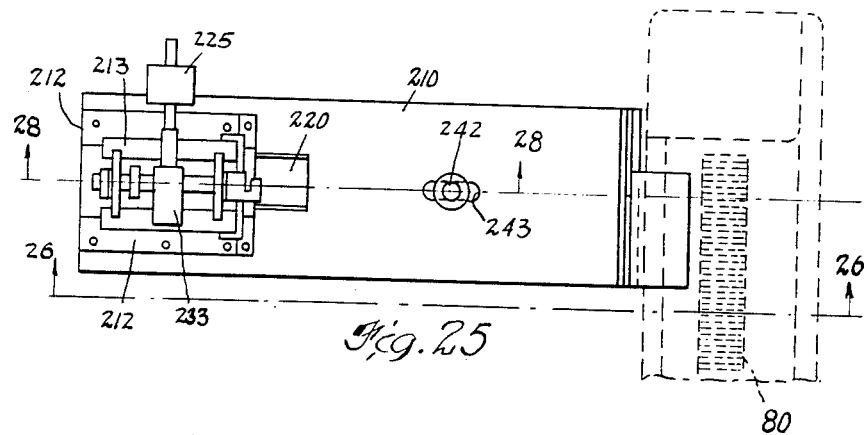
Fig. 25 is a plan view of the loading device.
Figure 26:
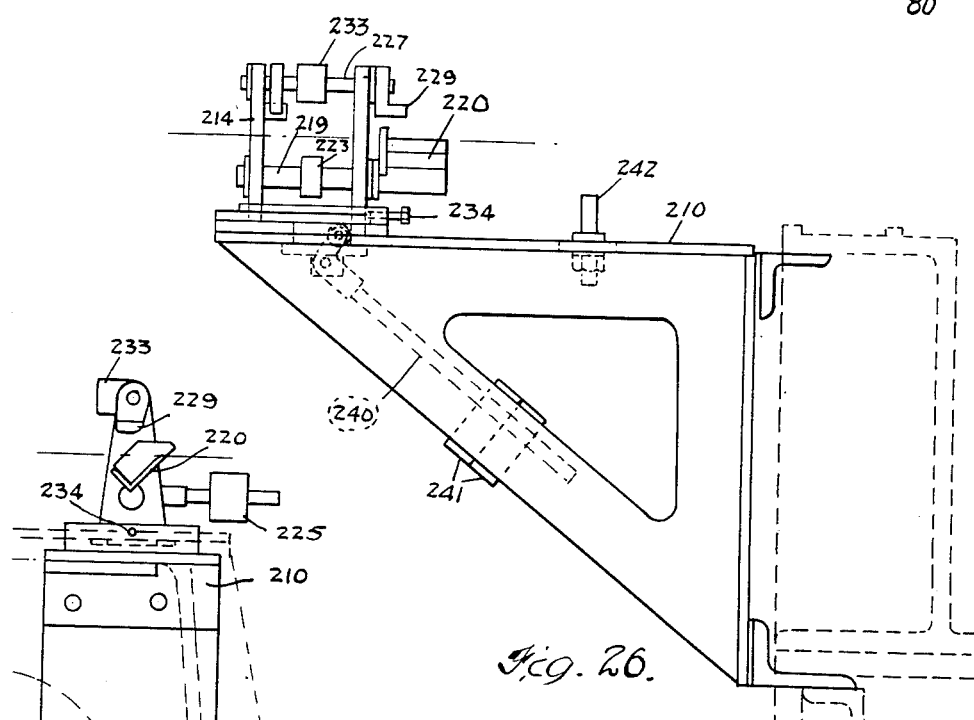
Fig. 26 is a view, partly in side elevation and partly in section of the loading device, taken on the line 26—26 of Fig. 25.
Figure 27:
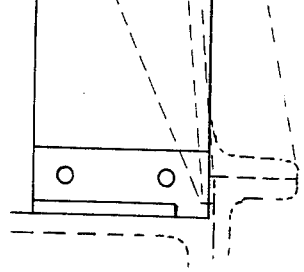
Fig. 27 is an end elevation of the loading device.
Figure 34:
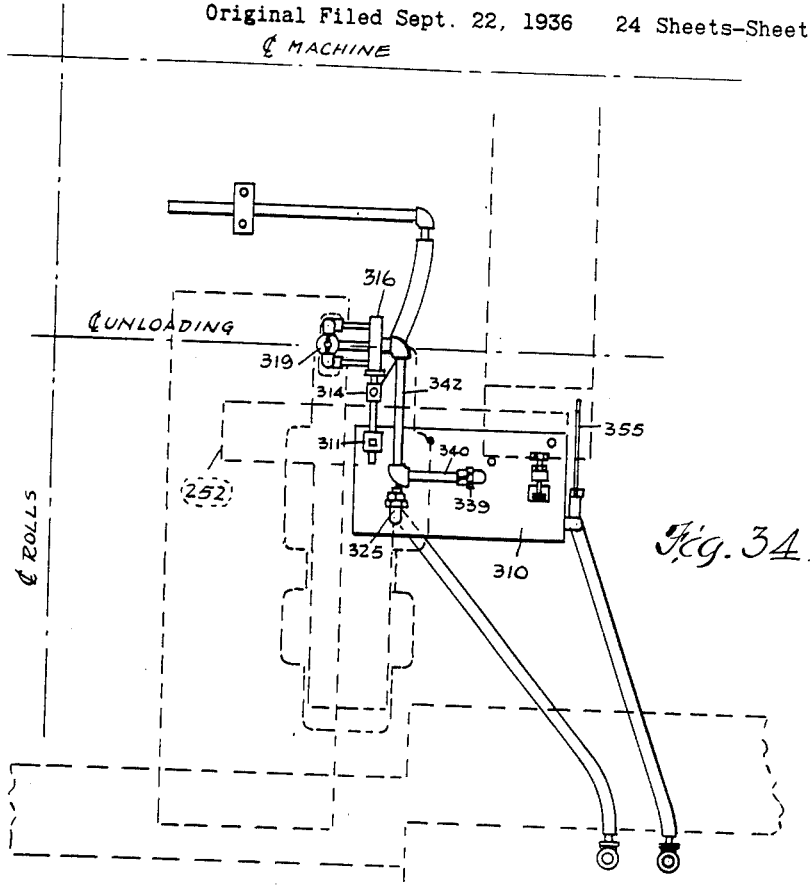
Figs. 34 and 35 are views showing the general arrangement of the chuck cooling device.

For the purpose of adjusting the apparatus bodily with respect to the roll forging mill, means are provided, as best shown in Figs. 2, 4 and 6, comprising a jack screw 300 which is pivotally connected as at 301 to the base of the apparatus at the rear end thereof. The rear end of this screw extends through a jack housing 302 mounted on a support 303 extending transversely of and secured to, members 16 and 17. Between the upstanding ears 304 and 305 of this jack housing is disposed a jack nut 306 which is in threaded engagement with the rear end of the jack screw. This nut is provided with radial openings adapted to receive a handle 307, whereby the nut may be rotated to adjust the position of the apparatus with respect to the mill.

Chuck cooling device

For the purpose of periodically cooling the chucks which become heated by the hot billets in the course of the forging operations, a chuck cooling device is provided, which is best disclosed in Figs. 34 to 39 inclusive of the drawings.

The chuck cooling device is disposed at the unloading side of the apparatus and is supported by a base plate 310 which is mounted on and is secured to the chute-supporting angle 252 of the chuck unloading device (Fig. 31). At the front end of this plate, adjacent one corner is an upstanding lug 311 having a transverse opening through which a bar 312 extends and is secured to the lug as by set screw 313. Secured to the bar 312 is a T connection 314, from the open horizontal branch of which extends a nipple 315 which communicates with a drainage manifold 316. Water drained into this manifold is drained therefrom by way of the nipple 315, T connection 314 and a conduit 317 connected to the vertical branch of the T connection.

Extending through the manifold 316 is an air conduit 318, to one end of which is secured a nozzle 319 having the upper end thereof flattened to provide an elongated air discharge opening 320. The lower end of the nozzle 319 is closed, as by a plug 321 welded thereto. Extending upwardly through the plug 321 and into the nozzle 319 is a water nozzle 322 which is closed at its upper end, but provided with laterally extending discharge openings 323, which are at a level slightly above the upper end of nozzle 319. Water is supplied to nozzle 322 as by means of conduit 324, elbow 325, conduit 326, elbow 327, conduit 328 and elbow 329.

The water discharged by nozzle 322 is atomized and blown upwardly by the air which is intermittently discharged by nozzle 319. Air is supplied to the nozzle 319 through conduit 330, elbow 331, nipple 332, whistle valve 333, nipple 334, an elbow 335 having a side outlet, nipple 336, elbow 337, riser 338, elbow 339, conduit 340, elbow 341, conduit 342, elbow 343 and conduit 318. The nipples 332 and 334 are supported by bars 344 depending from the base plate 310 and clamped to the nipples. The valve is normally maintained closed by means of a lever 345 which extends between the bars 344 and has secured thereto adjacent one end a transverse pin 346 which extends through elongated slots 347 in the bars 344. The lever is normally maintained in the valve closing position by means comprising a weighted lever 348. The lever 348 is pivoted as at 350 to those bars 344 which contain slots 347, and a link 349 is pivotally connected as at 351 to the lever 348 and as at 352 to one end of the lever 345.

Lever 345 is provided at its rear end with a member 353 which is adapted to be engaged at predetermined intervals for the purpose of lowering the lever 345 to open the valve 333.

For the purpose of thus opening the valve 333, a lever 354 is provided having an offset arm 355 which is adapted to be engaged by the spindle housing, as each spindle reaches the unloading position. The lever 354 is mounted on a rock shaft 356 which is carried in bearings 357 depending from base plate 310. This lever is provided with a laterally extending member 358 provided at one end with an adjusting bolt 359, which engages the member 353.

The normal position of the lever 354 is determined by adjustable cap screw 360 mounted in an upstanding ear 361 on the base plate and which engages a stop 362 rigidly secured to the rock shaft 356 and extending through an opening 363 in the base plate.

Secured to the side outlet of elbow 335 is a drainage nipple 364 and drain valve 365.

Figure 35:
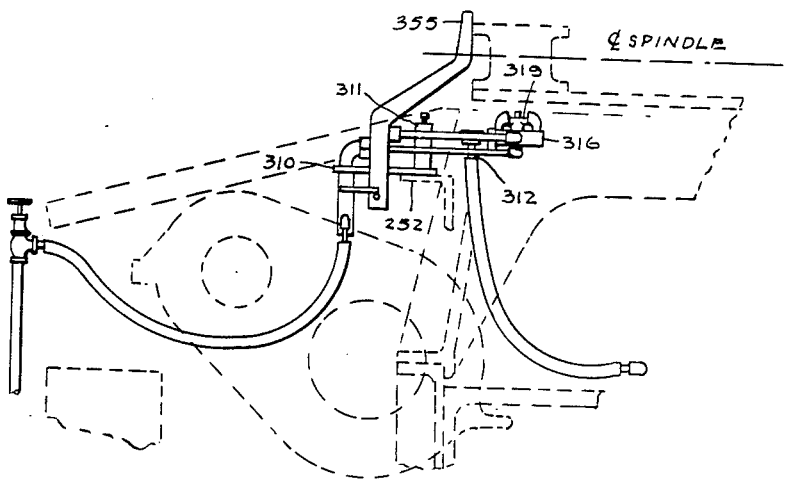
Figure 40:
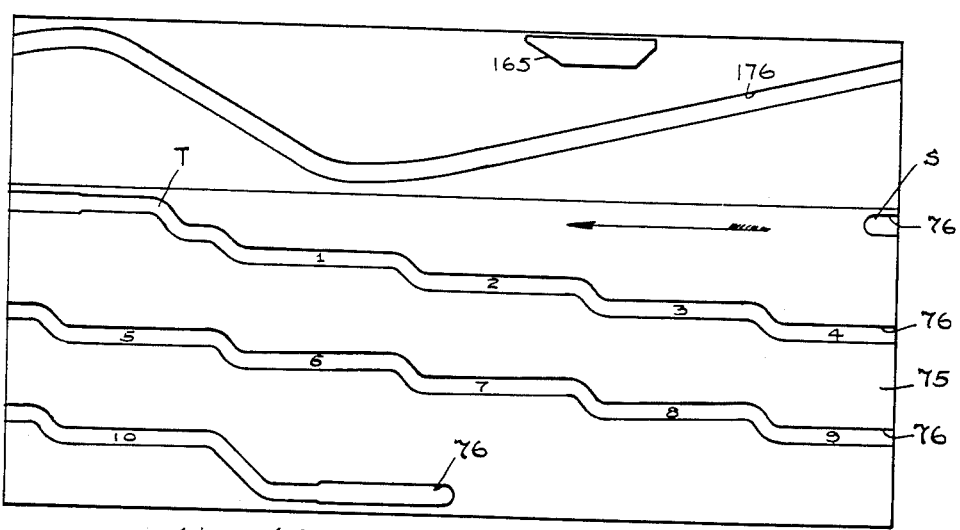
Fig. 40 is a development of the spindle cross cam and carry-over cam.
Figure 41:
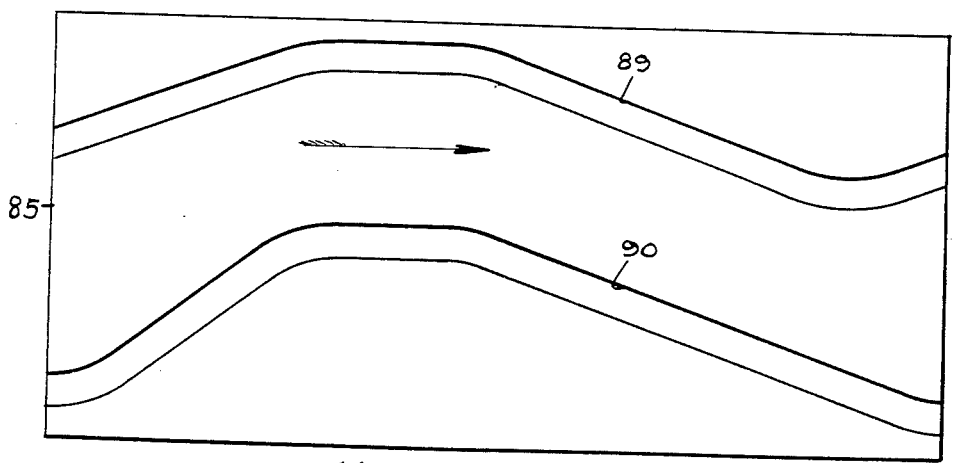
Fig. 41 is a development of the spindle reciprocating cam.
Figure 42:
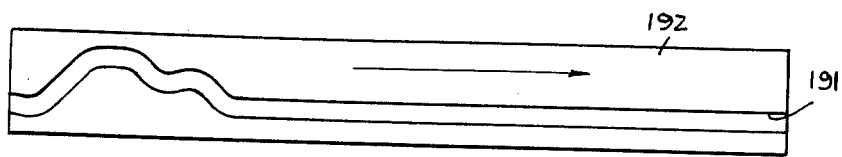
Fig. 42 is a development of the loading and unloading cam.
Figure 43:
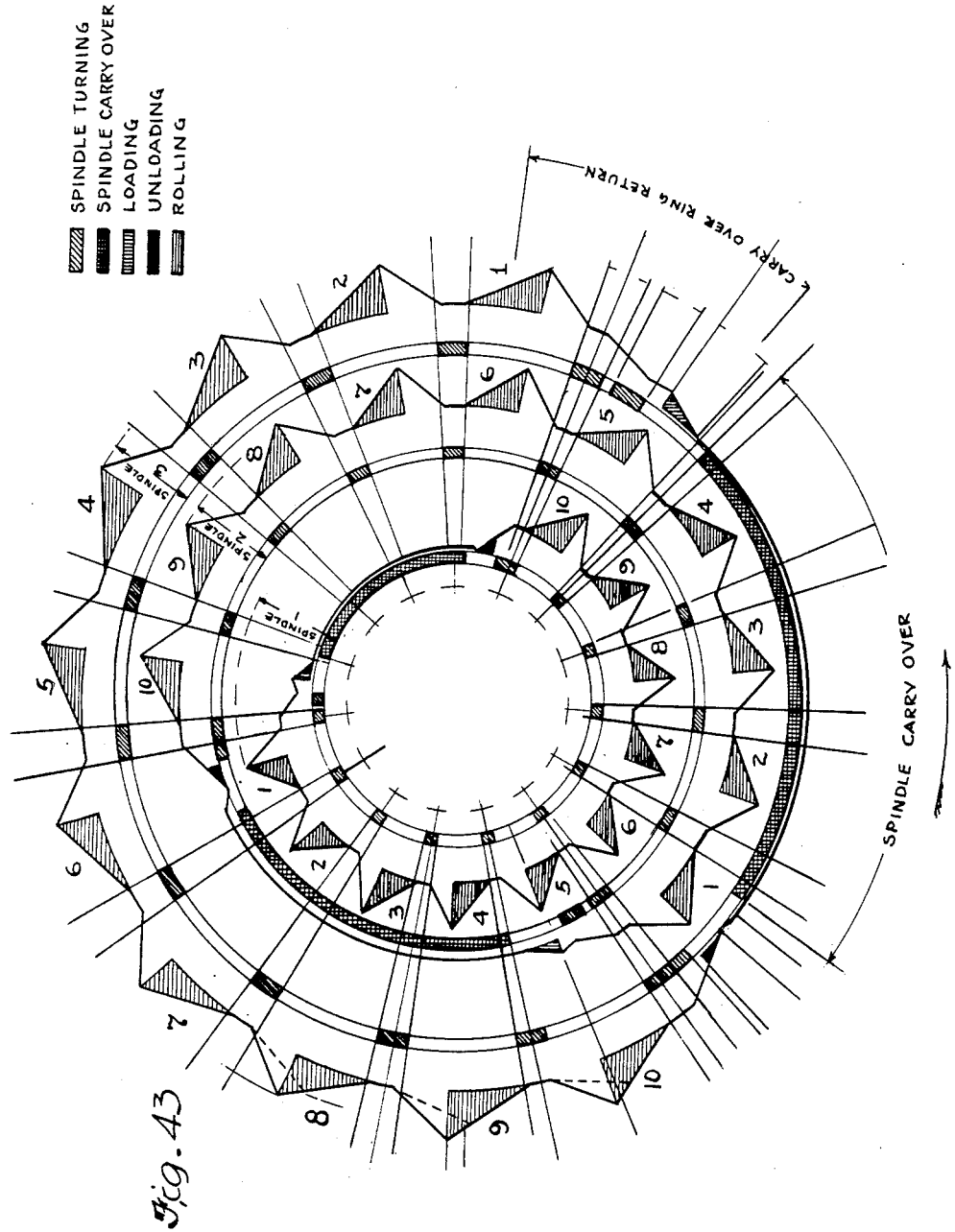
Fig. 43 is a timing diagram showing one complete cycle of operation of the apparatus.

It will be apparent from the foregoing description that as the spindle reaches the unloading position, the lever 354 is moved in a counter-clockwise direction, as viewed in Figs. 35 and 38, and to an extent sufficient to open the valve 333. With the valve thus opened, air is admitted into nozzle 319 and blows the water, which is being continuously discharged from openings 323, upwardly. The water thus atomized is sprayed against the hot chuck which is disposed above the nozzle when the spindle is in unloading position, thereby cooling the chuck. Upon movement of the spindle away from the unloading position, the counterweighted lever 348 closes the valve 333, thereby cutting off the air supply.

The water, however, continues to flow through the openings 323 and some of this water fills the nozzle 319. This water is drained through the valve 365. The overflow water from nozzle 319 as well as the bulk of the water discharged through openings 323 is discharged into elbows 366 which are disposed at the sides of nozzle 319. These elbows are connected at one end to other elbows 367, which in turn are connected with discharge manifold 316 by means of conduits 368.

*Operating mechanism*

The bevel gears 78, 91 and 196 are keyed to a shaft 375 so as to be simultaneously driven by this shaft. This shaft is driven in synchronism with the roll-forging mill by mechanism (not shown) which drives the rolls of the mill, and at the same time drives the shaft through the intermediary of bevel gears 376 and 377, shaft 378 and gears 379 and 380.

*Operation*

Having now described in detail the construction of the apparatus, the function thereof will be best understood by a description of the various movements and operations which each billet or bar blank undergoes from the time it is delivered to the apparatus until the time it is removed therefrom.

The billet, or bar blank B, as indicated in Fig. 1, after being heated to a forging temperature in a suitable furnace (not shown) is deposited on the billet support 220, and loosely clamped thereon by the clamp 229. In this position the billet is ready to be grasped by one of the spindle chucks, it being understood that one end of the billet projects beyond the support 220.

In the meantime, one of the spindles has been carried over into the loading position, that is, into a position in which it is in axial alignment with the billet. The spindle is shown as in this position in Figs. 9 and 10, and the loading position of the spindle is further indicated in Fig. 1. When the spindle has moved into the loading position, the chuck jaws will be open, having been previously opened as a result of the unloading operations, the head 47 of plunger 44 is held by the loading and unloading carriage against axial movement with respect to said carriage, the rear face of collar 48 is in engagement with the stop 203 and the pinion 32 is in mesh with the rack 202. At the same time, one of the cam rollers 25 on the spindle housing has entered the starting point of the cam groove 76, such point being designated S in Fig. 40.

While the spindle is in loading position, the cam drum 75 rotates so that the cam roller 25, in effect, traverses the cam groove 76 to the point T. During this interval, the loading and unloading carriage moves forwardly, carrying with it the spindle tube 31. As this tube moves forward, the crossed ends of the lever arms 67 at one side of the chuck engage the upstanding pin 242 and are moved rearwardly by this pin. As soon as the center of pivot pin 63 moves beyond a line joining the centers of pivot pins 61 and 65, the spring 34 causes the levers 60 and 64 to be snapped to the position shown in Fig. 21. This also causes the block 54 to move rearwardly, thereby causing the chuck jaws 51 to close on the billet and firmly grip the same. Before the billet is thus gripped by the chuck jaws, the ejector 58, which during the open position of said jaws extends forwardly into the space between the jaws, as shown in Fig. 21a, is moved rearwardly until it occupies the position shown in Fig. 21, in which it will be noted that the laterally extending members 73 are at their rearmost position with respect to the chuck body 49.

In order to insure that the billet will be properly gripped, the spindle is moved forwardly sufficiently to move the carriage 213 forwardly against the action of the counterweights 241, and in order to permit such carriage to return to its normal position, the spindle is moved rearwardly to some extent while still in the loading position. Thereafter, the spindle is moved laterally sufficiently to clear the pin 242, and at the same time it is moved forwardly until the head 47 is in alignment with the recess 97 in the head 96 of the spindle carriage, which has in the meantime reached its rearmost position. The spindle is then moved laterally in order to cause the head 47 to enter the recess 97, and such movement as well as a forward movement of the spindle is continued until the spindle is brought into alignment or indexed with the first pass of the mill.

The spindle carriage is then advanced in order to bring the billet into the first pass of the forging dies 14 and 15. As the billet is rolled out by these dies, the spindle is returned to its rearmost position. The speed of the spindle carriage during this return is substantially equal to the peripheral speed of the forging dies, but should the speed of the spindle carriage slightly exceed the speed of the dies, no harm will result to the spindle or billet for, in this event, the spring 42$^a$ will be compressed by the plunger sleeve 45, permitting a slight movement between the spindle and plunger 44. Likewise, should the speed of the spindle carriage be slightly less than the peripheral speed of the dies, the spring 42 will be compressed, and harm to the spindle or billet therefore avoided.

The indexing, feeding and withdrawal of the billet for the succeeding passes is identical with the movement just described with reference to pass 1, so that further description of these movements is believed to be unnecessary. It may be pointed out, however, that each of the indexing movements is accompanied by a rotation of the spindle through an arc of 90°, this being effected as a result of the engagement of pinions 28 with the racks 80.

After the return of the rolled article from pass 10 of the dies, the spindle is moved laterally so as to cause the head 47 to enter the guide 184 of the loading and unloading carriage, which has, in the meantime, moved to its extreme forward position. Movement of the spindle into this guide is continued until the spindle is in the unloading position, as indicated in Figs. 1 and 2. In this position of the spindle, the stop 208 engages the front face of the collar 48.

On rearward movement of the loading and unloading carriage, the spindle and plunger 44 will be carried rearwardly as a unit by the carriage. During this movement, one of the members 73 strikes the lever arm 247, moving this arm in a clockwise direction (Fig. 32), thereby raising the counterweights 249. On continued rearward movement, stop nut 41 on the spindle strikes the stop 205, so that the spindle tube 33 remains stationary. Since the tube 31 continues to move rearwardly, however, the chuck body will move relatively to the block 54, and the toggle mechanism will be actuated to open the jaws 51. As soon as the jaws 51 have been sufficiently opened to permit the billet to be ejected, it is ejected as a result of the counterweights 249 acting on the ejector 58 through the medium of lever 247 and the member 73 engaged by the latter.

The rearward movement of the tube 31 after movement of the spindle tube 33 has stopped results in a compression of spring 34, which compression is preserved by the toggle mechanism previously described. The expansion of the spring, which is effective to close the chuck jaws during the loading operation, has already been described.

The ejected billet or forged article is deposited on the inclined chute 251, from which it rolls or slides onto a delivery table (not shown).

Following the unloading operation, the spindle is moved to the loading position, by means of the carry-over mechanism which has been described. Since the head 47 of the plunger 44 is guided by the track 187 during the carry-over movement, longitudinal movement of the chuck body is prevented at such times.

Other modes of applying the principle of my invention may be employed instead of the one explained, change being made as regards the means herein disclosed, provided those stated by any of the following claims or their equivalent be employed.

I therefore particularly point out and distinctly claim as my invention:

1. In combination with a mill for roll-forging bar blanks, said mill including a pair of cooperating dies providing a plurality of passes, a spindle provided with a blank-holding chuck arranged to be successively aligned with each of said passes, means for moving said spindle transversely of said passes, and means independent of said last-named means for returning the spindle to its initial position after said transverse movement is completed.

2. In combination with a mill for roll-forging bar blanks, said mill including a pair of cooperating dies providing a plurality of passes, a spindle provided with a blank-holding chuck, a loading station for said spindle, means for moving said spindle transversely of said passes and into alignment with each of said passes successively, a spindle unloading station, and means independent of said first-named spindle moving means for returning the spindle from said unloading station to said loading station.

3. In combination with a mill for roll-forging blanks, said mill including a pair of cooperating dies providing a plurality of passes, a spindle provided with a blank-holding chuck, means for moving said spindle transversely of said passes and into alignment with each of said passes successively, and carriers rotatable about an axis parallel with said spindle for returning the spindle to its initial position.

4. In combination with a mill for roll-forging bar blanks, said mill including a pair of cooperating dies providing a plurality of passes, a spindle provided with a blank-holding chuck, a loading station for said spindle, means for moving said spindle transversely of said passes and into alignment with each of said passes successively, a spindle unloading station, and carriers rotatable about an axis parallel with said spindle for returning the spindle from said unloading to said loading station.

5. In combination with a mill for roll-forging bar blanks, said mill including a pair of cooperating dies providing a plurality of spaced parallel passes, a spindle provided with a blank-holding chuck, a loading station for said spindle, means for indexing said spindle with said passes, a spindle unloading station, carriers rotatable about an axis parallel with said spindle for returning the spindle from said unloading to said loading station, and means for intermittently rotating said carriers.

6. In apparatus of the character described, a frame, a spindle, a spindle loading station, a spindle unloading station, means for moving said spindle transversely of said frame, and means independent of said last-named means for positively moving said spindle from the unloading to the loading station.

7. In apparatus of the character described, a frame, a spindle provided with a chuck, a spindle loading station, means for moving said spindle transversely of said frame, a spindle unloading station, and carriers rotatable in planes transverse to said frame for moving the spindle from the unloading to loading station.

8. In apparatus of the character described, a frame, a spindle provided with a chuck, means for opening said chuck, means for closing said chuck, a carriage for reciprocating said spindle, and a second carriage for moving said spindle for actuation of said chuck for opening and closing thereof.

9. In apparatus of the character described, a frame, a spindle movable transversely of said frame, a carrier rotatable in a plane transverse to said frame, means for latching said spindle to said carrier, and means for rotating said carrier.

10. In apparatus of the character described, a frame, a spindle, a chuck mounted on said spindle, a chuck loading station adjacent one side of the frame, a chuck unloading station adjacent the other side of said frame, and means for carrying said spindle from the unloading to the loading station, said means comprising a ring rotatable in a plane transverse to said frame.

11. In apparatus of the character described, a frame, a spindle, a chuck mounted on said spindle, a chuck loading station adjacent one side of the frame, a chuck unloading station adjacent the other side of said frame, chuck loading means in alignment with said loading station, chuck unloading means in alignment with said unloading station, a carriage movable longitudinally of said frame for moving said spindle when in line with said stations, whereby coaction of said chucks with said loading and unloading means is effected to load and unload the chuck.

12. In apparatus of the character described, a frame, a spindle movable transversely of said frame, a chuck mounted on said spindle, and means actuated in response to the position of said spindle for cooling said chuck.

13. In apparatus of the character described, a spindle, a chuck mounted on said spindle, and means actuable by movement of said spindle for cooling said chuck.

14. In apparatus of the character described, a spindle, a chuck mounted on said spindle and adapted for holding hot bar blanks, and means controlled by movement of said spindle for periodically directing a cooling medium against said chuck.

15. In apparatus of the character described, a spindle, a chuck adapted for holding hot billets, and means for periodically spraying water against said chuck to cool the same.

16. In combination with a mill for roll-forging hot bar blanks, a spindle provided with a blank-holding chuck movable along said mill, and means responsive to movement of said chuck for cooling said chuck.

17. In apparatus of the character described, spindles, a carriage for reciprocating said spindles, carriage reciprocating means, and means independent of said reciprocating means for cushioning the movements of said carriage.

18. In apparatus of the character described, a chuck cooling device comprising means for spraying a cooling fluid in laterally directed streams, and means for intermittently blowing air against said streams and in a direction transversely of said streams.

19. In combination with a mill for roll-forging blanks, said mill including a pair of cooperating dies providing a plurality of passes, a spindle provided with a blank-holding chuck, means for moving said spindle transversely of said passes and into alignment with each of said passes successively, and a carrier independent of said spindle moving means and movable about an axis parallel with said spindle for returning the spindle to its initial position.

20. In combination with a mill for roll-forging bar blanks, said mill including a pair of cooperating dies providing a plurality of passes, a spindle provided with a blank-holding chuck, a loading station for said spindle, means for moving said spindle transversely of said passes and into alignment with each of said passes successively, a spindle unloading station, and a carrier independent of said spindle moving means and movable about an axis parallel with said spindle for returning the spindle from said unloading to said loading station.

21. In combination with a mill for roll-forging bar blanks, said mill including a pair of cooperating dies providing a plurality of spaced parallel passes, a spindle provided with a blank-holding chuck, a loading station for said spindle, means for indexing said spindle with said passes, a spindle unloading station, a carrier independent of said spindle moving means and movable about an axis parallel with said spindle for returning the spindle from said unloading to said loading station, and means for intermittently moving said carrier.

22. In apparatus of the character described, a frame, a spindle provided with a chuck, a spindle loading station, means for moving said spindle transversely of said frame, a spindle unloading station, and a carrier independent of said spindle moving means and movable in a plane transverse to said frame for moving the spindle from the unloading to loading station.

23. In apparatus of the character described, a frame, a spindle provided with a chuck, a spindle loading station, means for moving said spindle transversely of said frame, a spindle unloading station, a carrier movable in a plane transverse to said frame for moving the spindle from said unloading to said loading station, and means for latching said spindle to said carrier prior to the commencement of said last-named movement.

24. In apparatus of the character described, a frame, a spindle provided with a chuck, a spindle loading station, means for moving said spindle transversely of said frame, a spindle unloading station, a carrier movable in a plane transverse to said frame for moving the spindle from said unloading to said loading station, means for latching said spindle to said carrier prior to the commencement of said last-named movement, and means for releasing said spindle from control of said latching means prior to the termination of said last-named movement.

25. In apparatus of the character described, a frame, a spindle provided with a chuck, a spindle loading station, means for moving said spindle transversely of said frame, means for rotating said spindle about its axis during such transverse movement, a spindle unloading station, a carrier movable in a plane transverse to said frame for moving the spindle from the unloading to the loading station, and means for preventing rotation of said spindle about its axis during said last-named movement.

26. In apparatus of the character described, a frame, a spindle provided with a chuck, means for opening said chuck, means for closing said chuck, means for reciprocating said spindle, and means independent of said spindle reciprocating means for actuating said spindle to open or close said chuck.

27. In apparatus of the character described, a frame, a chuck, a chuck loading station, a chuck unloading station, and means responsive to movement of said chuck when at the unloading station for spraying a cooling fluid against the chuck.

JOHN F. FERM.